(12) United States Patent
Holler et al.

(10) Patent No.: US 8,875,088 B1
(45) Date of Patent: Oct. 28, 2014

(54) METHODS AND SYSTEMS FOR PERFORMING PROJECT SCHEDULE FORECASTING

(75) Inventors: Robert Holler, Cumming, GA (US); Ian Culling, Cumming, GA (US); Rajiv Delwadia, Woodstock, GA (US); Pavel Mamut, Buford, GA (US); Mark Crowe, Atlanta, GA (US); Donald Hanson, Cumming, GA (US); Patrick Boudreaux, Cumming, GA (US); Dan Gilkerson, San Diego, CA (US); Eric Farr, Alpharetta, GA (US); Jerry Odenwelder, Atlanta, GA (US)

(73) Assignee: Versionone, Inc., Alpharetta, GA (US)

( * ) Notice: Subject to any disclaimer, the term of this patent is extended or adjusted under 35 U.S.C. 154(b) by 947 days.

(21) Appl. No.: 12/357,225

(22) Filed: Jan. 21, 2009

(51) Int. Cl.
*G06Q 10/10* (2012.01)
*G06Q 10/06* (2012.01)

(52) U.S. Cl.
CPC .......... *G06Q 10/10* (2013.01); *G06Q 10/06312* (2013.01)
USPC ................................... 717/101; 705/8; 705/9

(58) Field of Classification Search
CPC ... G06Q 10/10; G06Q 10/06; G06Q 10/0631; G06Q 10/06311; G06Q 10/06312; G06Q 10/06398
USPC .......................................... 705/8–9; 717/100
See application file for complete search history.

(56) References Cited

U.S. PATENT DOCUMENTS

| | | |
|---|---|---|
| 5,544,300 A | 8/1996 | Skarbo et al. |
| 5,714,971 A | 2/1998 | Shalit et al. |
| 5,874,958 A | 2/1999 | Ludolph |
| 5,943,053 A | 8/1999 | Ludolph et al. |
| 5,956,030 A | 9/1999 | Conrad et al. |
| 6,175,364 B1 | 1/2001 | Wong et al. |
| 6,239,798 B1 | 5/2001 | Ludolph et al. |
| 6,694,009 B1 * | 2/2004 | Anderson et al. ........ 379/266.06 |
| 6,698,013 B1 | 2/2004 | Bertero et al. |
| 6,850,255 B2 | 2/2005 | Muschetto |
| 7,051,038 B1 | 5/2006 | Yeh et al. |
| 7,117,447 B2 | 10/2006 | Cobb et al. |
| 7,210,093 B1 | 4/2007 | Dutta |
| 7,272,815 B1 | 9/2007 | Eldridge et al. |
| 7,376,891 B2 | 5/2008 | Hitchock et al. |
| 7,415,677 B2 | 8/2008 | Arend et al. |

(Continued)

OTHER PUBLICATIONS

Holler, Office Action, U.S. Appl. No. 12/174,511, May 11, 2012, 21 pgs.

(Continued)

*Primary Examiner* — Jonathan C Teixeira Moffat
*Assistant Examiner* — Lynda Dinh
(74) *Attorney, Agent, or Firm* — Morgan, Lewis & Bockius LLP

(57) ABSTRACT

A computer-implemented method of performing project schedule forecasting based on stored project data includes receiving a first user input selecting a first plurality of work items in a project. Respective work items of the first plurality have respective work estimates. A second user input is received specifying one or more first work item attributes referencing historical work completion data. A first historical rate of work completion is determined in accordance with the historical work completion data referenced by the one or more first work item attributes. An estimated time of completion of the first plurality of work items is calculated in accordance with the first historical rate of work completion and provided for display.

24 Claims, 19 Drawing Sheets

(56) References Cited

U.S. PATENT DOCUMENTS

| | | |
|---|---|---|
| 7,421,648 B1 | 9/2008 | Davis |
| 7,490,314 B2 | 2/2009 | Yuknewicz et al. |
| 7,640,496 B1 | 12/2009 | Chaulk et al. |
| 7,644,390 B2 | 1/2010 | Khodabandehloo et al. |
| 7,899,694 B1 | 3/2011 | Marshall et al. |
| 7,930,201 B1 | 4/2011 | Issa et al. |
| 8,370,803 B1 | 2/2013 | Holler et al. |
| 2002/0062367 A1 | 5/2002 | Debber et al. |
| 2002/0089526 A1 | 7/2002 | Buxton et al. |
| 2002/0091732 A1 | 7/2002 | Pedro |
| 2003/0033589 A1 | 2/2003 | Reyna et al. |
| 2003/0046282 A1 | 3/2003 | Carlson et al. |
| 2003/0061330 A1 | 3/2003 | Frisco et al. |
| 2003/0103079 A1 | 6/2003 | Adatia et al. |
| 2003/0158845 A1 | 8/2003 | Bralcy |
| 2003/0160815 A1 | 8/2003 | Muschetto |
| 2003/0163404 A1 | 8/2003 | Hu et al. |
| 2003/0172020 A1 | 9/2003 | Davies et al. |
| 2003/0182470 A1 | 9/2003 | Carlson et al. |
| 2003/0182652 A1 | 9/2003 | Custodio |
| 2003/0188290 A1* | 10/2003 | Corral ........................... 717/101 |
| 2003/0204644 A1 | 10/2003 | Vincent |
| 2004/0081951 A1 | 4/2004 | Vigue et al. |
| 2004/0186762 A1 | 9/2004 | Beaven et al. |
| 2004/0243457 A1* | 12/2004 | D'Andrea et al. ................. 705/9 |
| 2004/0243968 A1 | 12/2004 | Hecksel |
| 2004/0268246 A1 | 12/2004 | Leban et al. |
| 2005/0004825 A1 | 1/2005 | Ehrler et al. |
| 2005/0065951 A1 | 3/2005 | Liston et al. |
| 2005/0086239 A1 | 4/2005 | Swann et al. |
| 2005/0086638 A1 | 4/2005 | Farn |
| 2005/0114829 A1 | 5/2005 | Robin et al. |
| 2005/0114830 A1* | 5/2005 | Knutson et al. ............... 717/102 |
| 2005/0132048 A1 | 6/2005 | Kogan et al. |
| 2005/0198615 A1 | 9/2005 | Choi et al. |
| 2005/0216879 A1 | 9/2005 | Ruhe |
| 2005/0229157 A1 | 10/2005 | Johnson |
| 2006/0069604 A1 | 3/2006 | Leukart et al. |
| 2006/0123389 A1 | 6/2006 | Kolawa et al. |
| 2006/0212327 A1* | 9/2006 | Norman ........................... 705/8 |
| 2006/0235771 A1 | 10/2006 | Oberoi |
| 2006/0236261 A1 | 10/2006 | Forstall et al. |
| 2007/0033567 A1 | 2/2007 | Carlson et al. |
| 2007/0094609 A1 | 4/2007 | Gilboa et al. |
| 2007/0124682 A1 | 5/2007 | Fukeda et al. |
| 2007/0168918 A1* | 7/2007 | Metherall et al. ............. 717/101 |
| 2007/0288292 A1 | 12/2007 | Gauger |
| 2008/0077416 A1 | 3/2008 | Hetrick |
| 2008/0077530 A1 | 3/2008 | Banas et al. |
| 2008/0097734 A1 | 4/2008 | Raffo |
| 2008/0154749 A1 | 6/2008 | D'hooghe et al. |
| 2008/0172625 A1 | 7/2008 | Montgomery |
| 2008/0282228 A1 | 11/2008 | Subramanyam |
| 2008/0301296 A1 | 12/2008 | York |
| 2009/0024647 A1 | 1/2009 | Hein |
| 2009/0204465 A1 | 8/2009 | Pradhan |
| 2009/0271760 A1 | 10/2009 | Ellinger |
| 2009/0300580 A1 | 12/2009 | Hcyhoe et al. |
| 2010/0088664 A1 | 4/2010 | Khodabandehloo et al. |
| 2010/0218092 A1 | 8/2010 | Xiang et al. |
| 2010/0306730 A9 | 12/2010 | Carlson et al. |

OTHER PUBLICATIONS

Holler, Office Action, U.S. Appl. No. 12/245,566, May 14, 2012, 15 pgs.

Barton, B. et al., "Reporting Scrum Project Progress to Executive Management through Metrics," Jan. 2005, 9 pages, http://www.spin-montreal.org/Downloads/Conférences/Saison_2006-2007/Reporting_Scrum_Progress.pdf.

Ceschi, Project Management in Plan-Based and Agile Companies, May/Jun. 2005, 7 pages, IEEE Software, 0740-7459/05.

Cruise Control, downloaded Apr. 9, 2010,1 page, http://cruisecontrol.sourceforge.net.

Cruise Control Overview, downloaded Apr. 9, 2010, 34 pages, http://cruisecontrol.sourceforge.net/overview.html.

Danube Technologies, ScrumWorks Pro—Documentation, Web Client User Guide, Feb. 2007, 7 pages.

De Luca, J., "Parking Lot Chart—Legend," Feature Driven Development, Mar. 16, 2007, 2 pages, http://www.featuredrivendevelopment.com/node/1037.

De Luca, J., "Parking Lot Chart Example 1, Feature Driven Development," http://www.featluredrivendevelopment.com/node/630, Dec. 17, 2003, 2 pages.

De Luca, J., "Parking Lot Chart Example 2," Nov. 20, 2003, 1 page, http://www.featured drivendevelopment.com/node/619.

De Luca, J., "Parking Lot Chart—Aesthetics," Mar. 16, 2007, 2 pages, http://www.featureddrivendevelopment.com/node/1038.

Derby, Agile Retrospectives, The Pragmatic Bookshelf, Dec. 26, 2007, 186 pgs.

JetBrains, "Distributed Build Management and Continuous Integration Server," Apr. 9, 2010, 3 pages, http://www.jetbrains.com/teamcity/features/index.html.

JetBrains, "Distsributed Build Management and Continuous Integrations Server: Features," Apr. 9, 2010, 2 pages, http://www.jetbrains.com/teamcity/features/index.html.

JetBrains, "TeamCity 3.0—Overview," Jun. 28, 2010, 10 pages, http://www.jetbrains.com/teamcity/documentation/TeamCity3-Overview.pdf.

JetBrains, "TeamCity 4.5," 2003-2009, 2 pages, http://www.jetbrains.com/teamcity/documentation/TeamCityData_Sheet.pdf.

Mountain Goat Software, Training for Scrum Task Board Use, Apr. 8, 2010, 5 pages, http://www.mountaingoatsoftware.com/scrum/task-boards.

Sandler, D., "Source Control in Ten Minutes: a Subversion Tutorial," Jan. 24, 2006, 6 pages, http://www.owlnet.rice.edu/~comp314/svn.html.

Screenshots of Xplanner, May 10, 2005, 1 page.

Sugarcrm, Sugarsuite Screenshot, Apr. 8, 2010, 1 pg.

VersionOne, Exhibit A and B, Figures 1 and 2, Oct. 19, 2006, 2 pgs.

XPlanner How to Notes, May 10, 2005, 9 pages, http://www.xplanner.org.

Holler, R., Office Action U.S. Appl. No. 12/247,963, Notification Date Mar. 15, 2012, 21 pages.

Odenwelder, Office Action, U.S. Appl. No. 12/463,299, Apr. 25, 2012, 18 pgs.

Holler, Office Action, U.S. Appl. No. 12/016,191, Jul. 19, 2012, 12 pgs.

Holler, Office Action, U.S. Appl. No. 12/016,192, Apr. 30, 2012, 12 pgs.

Holler, Office Action, U.S. Appl. No. 12/016,193, Jul. 9, 2012, 10 pgs.

Holler, Office Action, U.S. Appl. No. 12/101,089, May 23, 2012, 16 pgs.

Holler, Office Action, U.S. Appl. No. 12/247,939, Jun. 7, 2012, 9 pgs.

Holler, Office Action, U.S. Appl. No. 12/247,963, Jul. 9, 2012, 23 pgs.

Akerman, Using ontology to support development of software architectures, 2006, 13 pgs.

Ayewah, Evaluating Status Analysis Defect Warnings on Production Software, 2007, 7 pgs.

Boehm, A View of 20th and 21st Century Software Engineering, 2006, 18 pgs.

Holler, Notice of Allowance, U.S. Appl. No. 12/016,192, Sep. 28, 2012, 128 pgs.

Holler, Notice of Allowance, U.S. Appl. No. 12/247,963, Jan. 30, 2013, 8 pgs.

Holler, Office Action, U.S. Appl. No. 12/016,193, Jan. 30, 2013, 13 pgs.

Holler, Office Action, U.S. Appl. No. 12/174,511, Jan. 4, 2013, 23 pgs.

Holler, Office Action, U.S. Appl. No. 12/245,566, Apr. 24, 2013, 17 pgs.

Holler, Office Action, U.S. Appl. No. 12/245,566, Nov. 30, 2012, 16 pgs.

Holler, Office Action, U.S. Appl. No. 12/247,939, Nov. 19, 2012, 9 pgs.

(56) References Cited

OTHER PUBLICATIONS

Holler, Office Action, U.S. Appl. No. 12/247,939, Apr. 26, 2013, 5 pgs.
Kolcz, Using SPEM/UML Profile to Specification of IS Development Process, Oct. 2006, 68 pgs.
Li, Empirical Evaluation of Defect Projection Models for Widely-deployed Production Software Systems, 2004, 10 pgs.
Lyu, Software Reliability Engineering: A Roadmap, 2007, 18 pgs.
Odenwelder, Notice of Allowance, U.S. Appl. No. 12/463,299, Dec. 4, 2012, 13 pgs.
Robbins, Adopting Open Source Software Engineering Practices by Adopting OSSE Tools, 2005, 16 pgs.
Yu, A Versatile Development Process for Small to Large Projects Using IBM CMVC, 1994, 9 pgs.
Holler, Office Action, U.S. Appl. No. 12/016,191, Jun. 19, 2013, 13 pgs.
Holler, Office Action, U.S. Appl. No. 12/101,089, Jun. 20, 2013, 13 pgs.
Holler, Office Action, U.S. Appl. No. 12/101,084, Jun. 21, 2013, 14 pgs.
Chou, Redesigning a large and complex website: how to begin and a method for success, ACM, Providence, RI, Nov. 20-23, 2002, pp. 22-28.
Holler, Final Office Action, U.S. Appl. No. 12/101,089, Mar. 12, 2014, 16 pgs.
Holler, Notice of Allowance, U.S. Appl. No. 12/016,191, Jan. 15, 2014, 7 pgs.
Holler, Notice of Allowance, U.S. Appl. No. 12/245,566, Nov. 26, 2013, 11 pgs.
Holler, Notice of Allowance, U.S. Appl. No. 13/858,819, Apr. 3, 2014, 8 pgs.
Holler, Office Action, U.S. Appl. No. 13/858,819, Nov. 18, 2013, 10 pgs.
Ouimet, SERT: Software Tool for Generating Student Engagement Reports, IEEE, ITNG'07, 2007, 8 pgs.
Phan et al., Progressive Multiples for Communication-Minded Visualization, ACM, Montreal, Canada, May 28-30, 2007, pp. 225-232.
Ribarsky et al., Glyphmaker: Creating Customized Visualizations of Complex Data, IEEE, Jul. 1994, pp. 57-64.
Shih et al., Using URLs and Table Layout for Web Classification Tasks, ACM, New York, NY, May 17-22, 2004, pp. 193-202.
Sneed, Reengineering Reports, IEEE, WRCE'04, 2004, 11 pgs.
Microsoft Office Online, "Understanding Scheduling in Microsoft Project 2002," 7 pages, http://office.microsoft.com/en-us/project/HA010563061033.aspx.
Microsoft Office Online, "Demo: Base Sales Forecasts and Trendlines on Data," 3 pages, http://office.microsoft.com/en-us/excel/HA010929231033.aspx, 2002.
Microsoft Office Online, "Demo: Check that Hunch with Excel 'What-if' Scenarios," 1 pages, http://office.microsoft.com/en-us/excel/HA01092946103.aspx, 2002.
Microsoft Office Online,"Show Trends and Forecast Sales with Charts," 7 pages, http://office.microsoft.com/en-us/excel/HA010877851033.aspx, 2002.
Netsuite, "Standard & Advanced Sales Forecasting Software," 6 pages, http://www.netsuite.com/portal/products/netsuite/sfa_forcast.shtml, 2002.
Vanguard Software, "Forecasting Software," 4 pages, http://www.vanguardsw.com/solutions/application/forecasting/default.htm?gclid=CLHZpPPSmZgCFOKJxgodriAimg, 2002.
IBM / Cognos Software, "Budgeting and Forecasting Software," 3 pages, http://www.cognos.com/performance-management/software-planning-budgeting-forcasting.html, 2002.
Cause, G., "Delivering Real Business Value Using FDD," Methods and Tools, Winter 2004 (vol. 12—No. 4), pp. 23-35, http://www.methodsandtools.com/PDF/mt200404.pdf.
De Luca, J., "FDD Implementations," Nebulon Pty. Ltd., 10 pages, http://www.nebulon.com/articles/fdd/fddimplementations.html and http://web.archive.org/web/20051118103830/nebulon.com/articles/fdd/fddimplementations.html archived Nov. 2005.
Fowler, M., "The New Methodology," martinfowler.com Dec. 13, 2005, 19 pages, http://www.martinfowler.com/articles/newMethodology.html.
Danube Technologies, "ScrumWorks Quick Start Guide—Version 1.4.2," 10 pages, http://web.archive.org/web/20060117203359/danube.com/docs/scrumworks/latest/quickstart.html, archived Jan. 2006.
Danube Technologies, "ScrumWorks Web Client User Guide—Version 1.4.2," 6 pages, http://web.archive.org/web/20060117203638/danube.com/docs/scrumworks/latest/webuserguide.html, archived Jan. 2006.
VersionOne, "Frequently Asked Questions," © 2005 VersionOne, LLC, 4 pages.
VersionOne, "Simplifying Software Delivery," © 2006 VersionOne, LLC, 1 page.
VersionOne, "Simplify the Rollout of Agile Development within Your Organization," © 2007 VersionOne, LLC, 2 pages.

\* cited by examiner

Figure 2F

METHODS AND SYSTEMS FOR PERFORMING PROJECT SCHEDULE FORECASTING

TECHNICAL FIELD

The disclosed embodiments relate generally to project management software, and more particularly, to performing project schedule forecasting using project management software.

BACKGROUND

Agile software development refers to software development methodologies in which software is developed incrementally in steps referred to as iterations. Iterations typically are measured in weeks and may vary in length from one week or less to one month or more. Examples of agile software development methodologies include Scrum, Extreme Programming (XP), Crystal, Lean Development, AgileUP, and Dynamic Systems Development Method (DSDM). Agile software development methods also have been referred to as lightweight methods. Methodologies may have their own vocabulary. For example, an iteration may be referred to as a sprint or a timebox, depending on the methodology. Agile software development is distinguishable from the "waterfall" model of sequential software development.

Software for implementing agile development methodologies and for tracking and reporting on projects that use agile methodologies can help developers to realize fully the benefits, such as flexibility and rapid cycle times, offered by these methodologies. Accordingly, there is a need for robust agile development management software that is convenient to use.

More generally, regardless of the project management methodology being used, project managers may desire to use historical data regarding rates of work completion to perform accurate forecasting and may desire to rapidly evaluate different project scheduling scenarios. Accordingly, there is a need for project management software that allows for data-driven, on-the-fly project schedule forecasting.

SUMMARY

In some embodiments, a computer-implemented method of performing project schedule forecasting based on stored project data includes receiving a first user input selecting a first plurality of work items in a project. Respective work items of the first plurality have respective work estimates. A second user input is received specifying one or more first work item attributes referencing historical work completion data. A first historical rate of work completion is determined in accordance with the historical work completion data referenced by the one or more first work item attributes. An estimated time of completion of the first plurality of work items is calculated in accordance with the first historical rate of work completion and provided for display.

In some embodiments, a computer-implemented method of performing project schedule forecasting based on stored project data is performed at a client system. In the method, a first user input is received selecting a first plurality of work items in a project. Respective work items of the first plurality have respective work estimates. A second user input is received specifying one or more first work item attributes referencing historical work completion data. The first and second user inputs are transmitted to a server system distinct from the client system. An estimated time of completion of the first plurality of work items, calculated in accordance with a first historical rate of work completion determined in accordance with the historical work completion data referenced by the one or more first work item attributes, is received from the server system and displayed.

In some embodiments, a system for performing project schedule forecasting based on stored project data includes memory, a display, one or more processors, and one or more programs stored in the memory and configured for execution by the one or more processors. The one or more programs include instructions to receive a first user input selecting a first plurality of work items in a project. Respective work items of the first plurality have respective work estimates. The one or more programs also include instructions to receive a second user input specifying one or more first work item attributes referencing historical work completion data, instructions to determine a first historical rate of work completion in accordance with the historical work completion data referenced by the one or more first work item attributes, instructions to calculate an estimated time of completion of the first plurality of work items in accordance with the first historical rate of work completion, and instructions to provide the estimated time of completion of the first plurality of work items for display.

In some embodiments, a system for performing project schedule forecasting based on stored project data includes memory, a display, one or more processors, and one or more programs stored in the memory and configured for execution by the one or more processors. The one or more programs include instructions to receive a first user input selecting a first plurality of work items in a project. Respective work items of the first plurality have respective work estimates. The one or more programs also include instructions to receive a second user input specifying one or more first work item attributes referencing historical work completion data and instructions to transmit the first and second user inputs to a server system distinct from the client system. The one or more programs further include instructions to receive and display an estimated time of completion of the first plurality of work items, wherein the estimated time of completion is calculated in accordance with a first historical rate of work completion determined in accordance with the historical work completion data referenced by the one or more first work item attributes.

In some embodiments, a computer readable storage medium stores one or more programs configured to be executed by a computer system to perform project schedule forecasting based on stored project data. The one or more programs include instructions to receive a first user input selecting a first plurality of work items in a project. Respective work items of the first plurality have respective work estimates. The one or more programs also include instructions to receive a second user input specifying one or more first work item attributes referencing historical work completion data, instructions to determine a first historical rate of work completion in accordance with the historical work completion data referenced by the one or more first work item attributes, instructions to calculate an estimated time of completion of the first plurality of work items in accordance with the first historical rate of work completion, and instructions to provide the estimated time of completion of the first plurality of work items for display.

In some embodiments, a computer readable storage medium stores one or more programs configured to be executed by a client computer system to perform project schedule forecasting based on stored project data. The one or more programs include instructions to receive a first user input selecting a first plurality of work items in a project.

Respective work items of the first plurality have respective work estimates. The one or more programs also include instructions to receive a second user input specifying one or more first work item attributes referencing historical work completion data and instructions to transmit the first and second user inputs to a server system distinct from the client system. The one or more programs further include instructions to receive and display an estimated time of completion of the first plurality of work items, wherein the estimated time of completion is calculated in accordance with a first historical rate of work completion determined in accordance with the historical work completion data referenced by the one or more first work item attributes.

BRIEF DESCRIPTION OF THE DRAWINGS

FIG. 2F is a schematic screenshot of a goal creation user interface in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
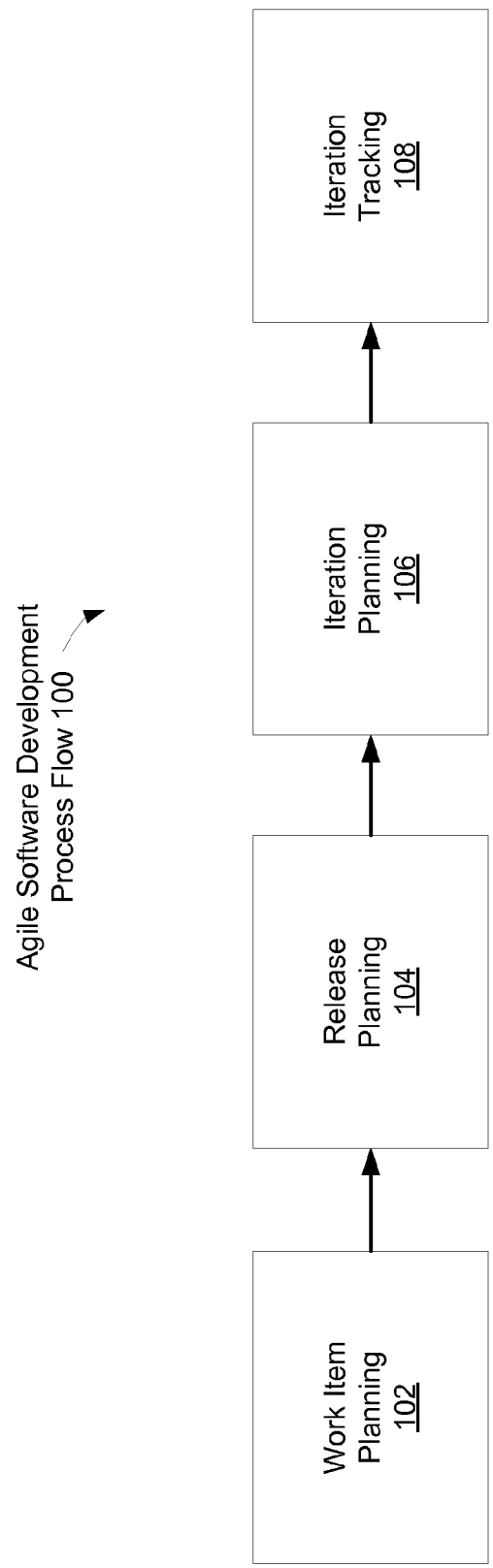
FIG. 1 is a flow diagram illustrating an agile software development process flow 100 in accordance with some embodiments.

FIG. 1 is a flow diagram illustrating an agile software development process flow 100 in accordance with some embodiments. Support for performing operations in the process flow 100 can be provided by agile development management software.

Work item planning (102) includes identifying work to be performed during the software development process. For example, features to be included in the software being developed are specified and software defects to be fixed during development are identified. Depending on the agile methodology being used, features also may be referred to as stories, backlog items, or requirements. In the context of agile software development, a work item is any item for which the agile development management software platform can track progress, such as time spent working on the item. Estimates for the time that work items require for completion (e.g., the time to complete features or to fix defects) may be entered during the work item planning process. Furthermore, groups of work items may be defined. For example, a feature group may be defined to include a plurality of features. Defined groups of work items may contain different types or levels of work items and thus be hierarchical, or alternatively may contain a single type or level of work items and thus be flat. Work estimates for the features within a feature group may be added together to provide an overall work estimate for the feature group. The work estimate for a group of work items (e.g., a feature group) thus may provide a roll-up of the work estimates for the individual work items (e.g., features) in the group.

Release planning (104) includes assigning identified work items (e.g., features and defects) to particular planned software releases. For example, certain features may be included in an initial release, with additional features to be added in subsequent releases. Similarly, fixing various defects may be scheduled across multiple releases. More generally, release planning may include assigning identified work items to levels or nodes in a project hierarchy. The project hierarchy may include projects, sub-projects, releases, teams and other internal organizations, clients or customers, and vendors.

Iteration planning (106) includes assigning work items to iterations. There may be multiple iterations performed to prepare a particular software release; iteration planning thus involves specifying what work will be performed in which iterations. For example, features and defects are assigned to particular iterations. Within each iteration, tasks and tests corresponding to the features and defects are defined. A task is a unit of work performed as part of delivering a feature. In some embodiments, a task is defined such that it takes no more than 3 days to perform. A test is an acceptance criterion that a feature must satisfy. Estimates for the time required to complete tests and tasks may be entered. In some embodiments, the estimates for tasks and tests are independent of the estimates for their features. Tasks and tests are examples of work items.

One or more goals may be defined during work item planning 102, release planning 104, and/or iteration planning 106. A goal name may be entered and one or more work items assigned to the goal. The goal thus serves as a roll-up of a set of work items. In some embodiments, the set of work items is user-defined. Work items assigned to a particular goal may be associated with a single level or multiple levels in a project hierarchy. For example, a particular goal may roll up work items associated with a particular project, sub-project, release, team and other internal organization, client or customer, or vendor. Alternatively, a particular goal may roll up work items associated with various projects, sub-projects, releases, teams and other internal organizations, clients or customers, and/or vendors. Examples of goals include an objective for a particular project, a project milestone, and a strategic goal for a company or business unit.

The actual time spent working on the work items (e.g., on the features and defects and their corresponding tasks and tests) during an iteration is tracked (108) and compared against the estimates. Progress and status reports may be displayed graphically. For example, a "dashboard" user interface may display multiple graphical reports. Possible graphical reports include burndown charts, velocity charts, burn-up charts, Gantt charts, parking lot reports, scope change, defect trending, test case status, and defect actuals. A burndown chart illustrates remaining work vs. time. Velocity refers to the estimated work per iteration on a project. Scope change refers to a change in requirements, such as the addition or deletion of features and defects. Reports may be generated for a specified level or node in the project hierarchy (e.g., for a specified project, sub-project, release, team or other internal organization, client or customer, and/or vendor.) Reports also may be generated for particular goals.

The operations in the development process flow 100 are presented sequentially in FIG. 1 for purposes of illustration. However, the operations need not be performed sequentially. For example, the planning operations 102, 104, and 106 may be updated dynamically throughout the agile development process. Similarly, tracking 108 may be performed dynamically, and may prompt subsequent planning changes. Furthermore, multiple operations may be combined into a single operation and additional operations may be added to the flow 100.

As used herein, terms such as "work item," "release," "project hierarchy," and "goal" are not limited to the context of agile development management software, but instead may apply to any type of project management software. A work item thus is any item for which project management software can track progress, such as time spent working on the item, and a goal is a roll-up of a set of work items. A release may refer to any type of product release. A project hierarchy may refer to any set of levels or nodes associated with a project being managed using project management software. In addition, "velocity" is merely one example of a rate of work completion associated with a project. Other rates of work completion include but are not limited to the amount of estimated work completed per release or per a specified period of time (e.g., a day, a week, or a month).

At a high level, a project development process such as the agile software development process 100 has various assets associated with it. Nodes in the project hierarchy, such as projects, sub-projects, releases, teams, clients, and vendors, can be considered assets, as can iterations. Work items such as features and defects are assets, as are tasks and tests. Feature groups are assets, as are goals. Assets may be associated with (i.e., related to) other assets. In some embodiments, for example, tasks and tests are associated with corresponding features and defects, which in turn may be associated with corresponding iterations. In another example, features in a particular feature group are associated with the feature group.

An asset includes various attributes. In some embodiments, each kind of asset (e.g., work item, project, goal, feature group, feature, task, etc.) has a specified set of associated, or related, attributes. Types of attributes include text strings, numerical values, values calculated according to a formula ("synthetic attributes"), and associated/related assets. A first asset associated with (i.e., related to) a second asset thus is considered an attribute of the second asset. An attribute may be automatically included (e.g., hard-coded or created for a particular installation) in project management software or may be customized (i.e., user-defined).

Attention is now directed to user interfaces (UIs) for project management software. While the following UIs are described with respect to agile development management software, analogous UIs may be provided by other types of project management software. In some embodiments, UIs are shown in a browser window. In some embodiments, UIs are shown by a stand-alone application.

Agile development management software can display groups of assets of a particular type. For example, groups of assets associated with work item planning, release planning, or iteration planning may be displayed.

Figure 2A:
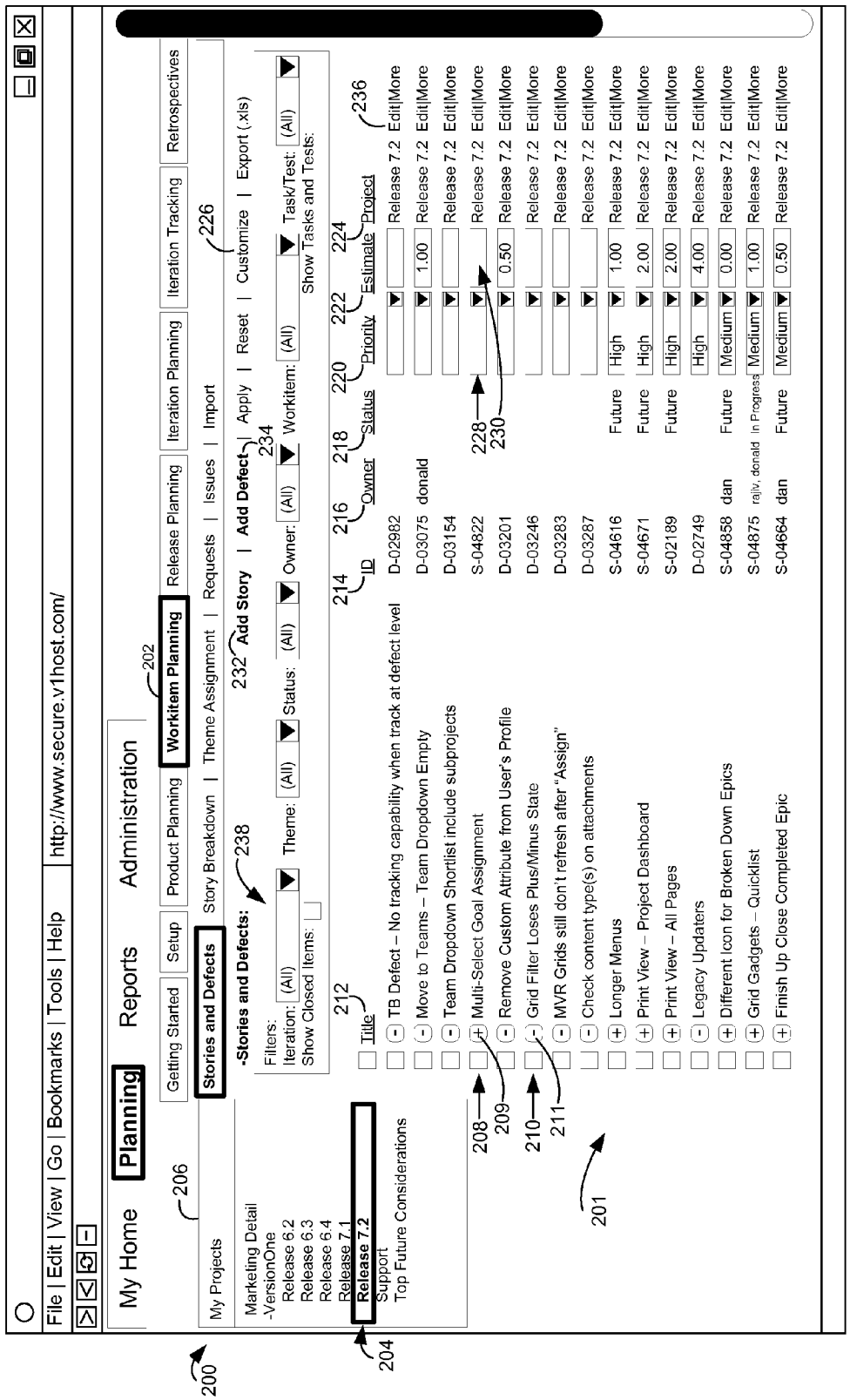
FIGS. 2A and 2B are schematic screenshots of a user interface displaying assets associated with an agile software development process in accordance with some embodiments.

FIG. 2A is a schematic screenshot of a user interface 200 displaying a group 201 of assets associated with an agile software development process, in accordance with some embodiments. In some embodiments, the particular type of group is determined by selecting a tab, selection box, radio button icon, or item in a drop-down menu. For example, in FIG. 2A a "workitem planning" tab 202 has been selected, indicating that the group 201 is a work item planning group. A group of a particular type may include multiple kinds of assets. For example, the work item planning group 201 includes features (e.g., "Multi-Select Goal Assignment" 208) and defects (e.g., "Grid Filter Loses Plus/Minus State" 210), as indicated by features icons 209 and defects icons 211.

The displayed assets in the group 201 are associated with a particular project hierarchy node 204, displayed for example in a project selection window 206.

Assets may be added to the group 201, for example, by selecting an "add story" (i.e., add feature) link 232 or an "add defect" link 234. In general, a user interface for displaying a group of assets may include multiple links or icons for adding multiple respective kinds of assets, or may include a single link or icon for adding assets (e.g., a single "add work item" link (not shown)). In some embodiments, selection of a link or icon for adding assets results in the display of a separate user interface for adding assets (not shown).

Assets displayed in the group 201 also may be edited, for example, by selecting an "edit" link (e.g., 236) corresponding to a respective asset. In some embodiments, selection of an edit link or corresponding icon results in the display of a separate user interface for editing assets, as described below with regard to FIGS. 2B-2D.

The displayed assets include a set of attributes selected for display, such as title 212, ID 214, owner 216, status 218, priority 220, estimate 222, and project 224. Some of the attributes are also assets, such as project 224. Some of the values for the attributes are blank: for example, no owner 216, status 218, priority 220, or estimate 222 is shown for a number of assets, including feature 208.

Assets to be displayed in the group 201 may be filtered according to one or more attributes using filters 238.

A subset of the displayed attributes includes user input fields to accept edits to attribute values. For example, a user may select a priority from a drop-down box 228 and may enter a work or size estimate (e.g., an estimate of time) in a text input box 230.

Figure 2B:
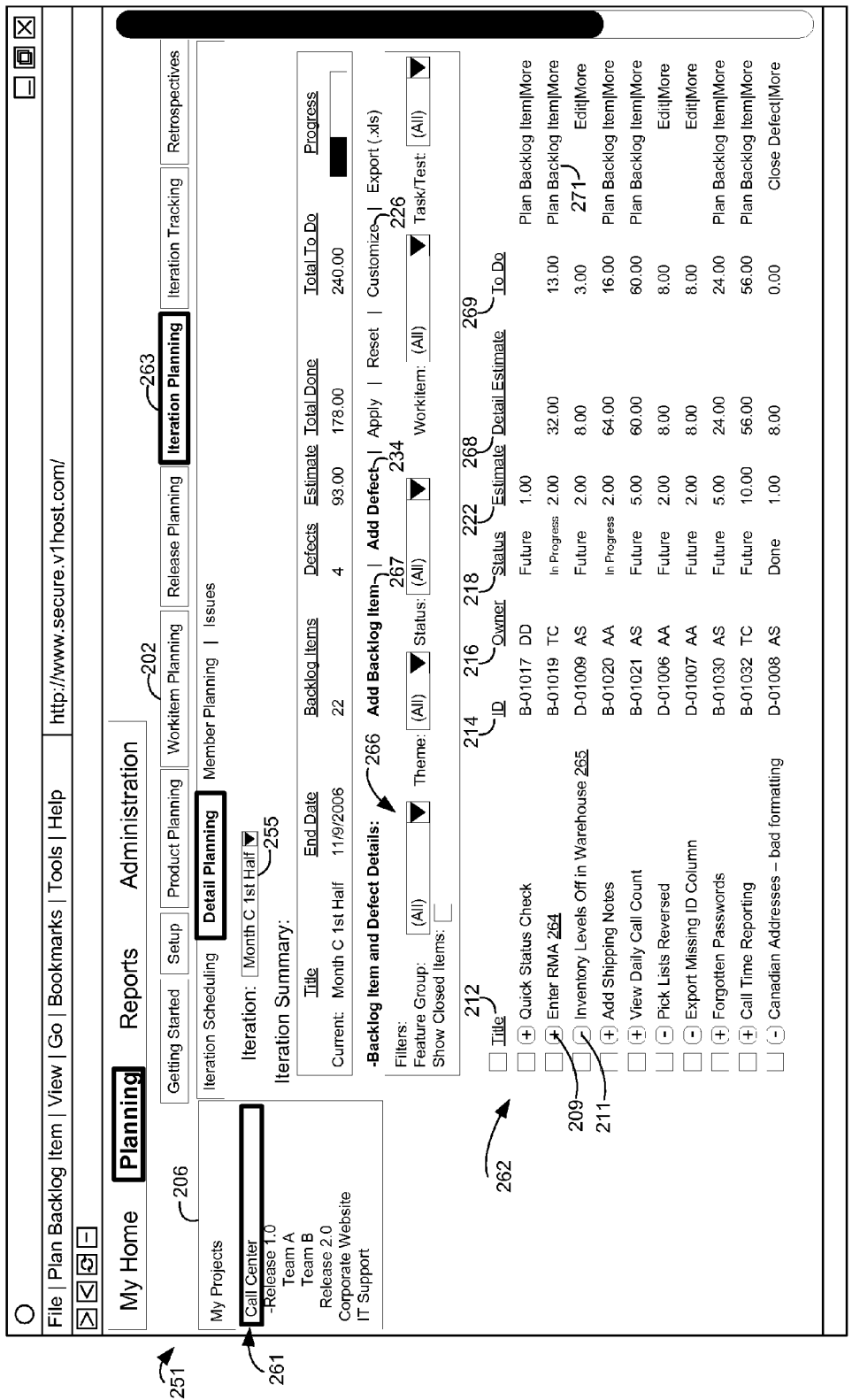

FIG. 2B, like FIG. 2A, is a schematic screenshot of a user interface displaying a group of assets associated with an agile software development process in accordance with some embodiments. Specifically, the user interface 251 of FIG. 2B displays a group 262 of assets associated with iteration planning, as indicated by selection of an "iteration planning" tab 263. The iteration planning group 262 includes features (e.g., "Enter RMA" 264) and defects (e.g., "Inventory Levels Off in Warehouse" 265), as indicated by features icons 209 and defects icons 211. The displayed assets in the group 262 are associated with a particular iteration 255. The displayed assets in the group 262 also are associated with a particular project hierarchy node 261 (also referred to as a project hierarchy level 261), displayed for example in the project selection window 206. The project hierarchy node 261 corresponds to a project entitled "Call Center," which includes multiple software releases (e.g., "Release 1.0" and "Release 2.0") and has multiple teams (e.g., "Team A" and "Team B") working on releases. Each release and each team may be selected as a project hierarchy node in the project selection window 206. In some embodiments, in response to selection of a particular project hierarchy node, the displayed group of assets is updated to display assets associated with the selected project hierarchy node. For example, in response to selection of a particular release or team, the displayed group 262 of assets is updated to display assets associated with iteration planning for the selected release or team.

Assets to be displayed in the group 262 may be filtered according to one or more attributes using filters 266. Assets may be added to the group 262 by, for example, selecting an "add backlog item" link 267 or an "add defect" link 234.

The displayed assets in the group 262 include a set of attributes, such as title 212, ID 214, owner 216, status 218, estimate 222, detail estimate 268, and "to do" 269. The "estimate" 222 and "detail estimate" 268 attributes provide estimates of quantities of work associated with assets, while the "to do" 269 attribute provides estimates of quantities of work remaining to be done for assets. As discussed with regard to FIG. 2A, some of the attributes may be assets associated with a displayed asset in the group 262 (i.e., may be related assets).

Figure 2C:
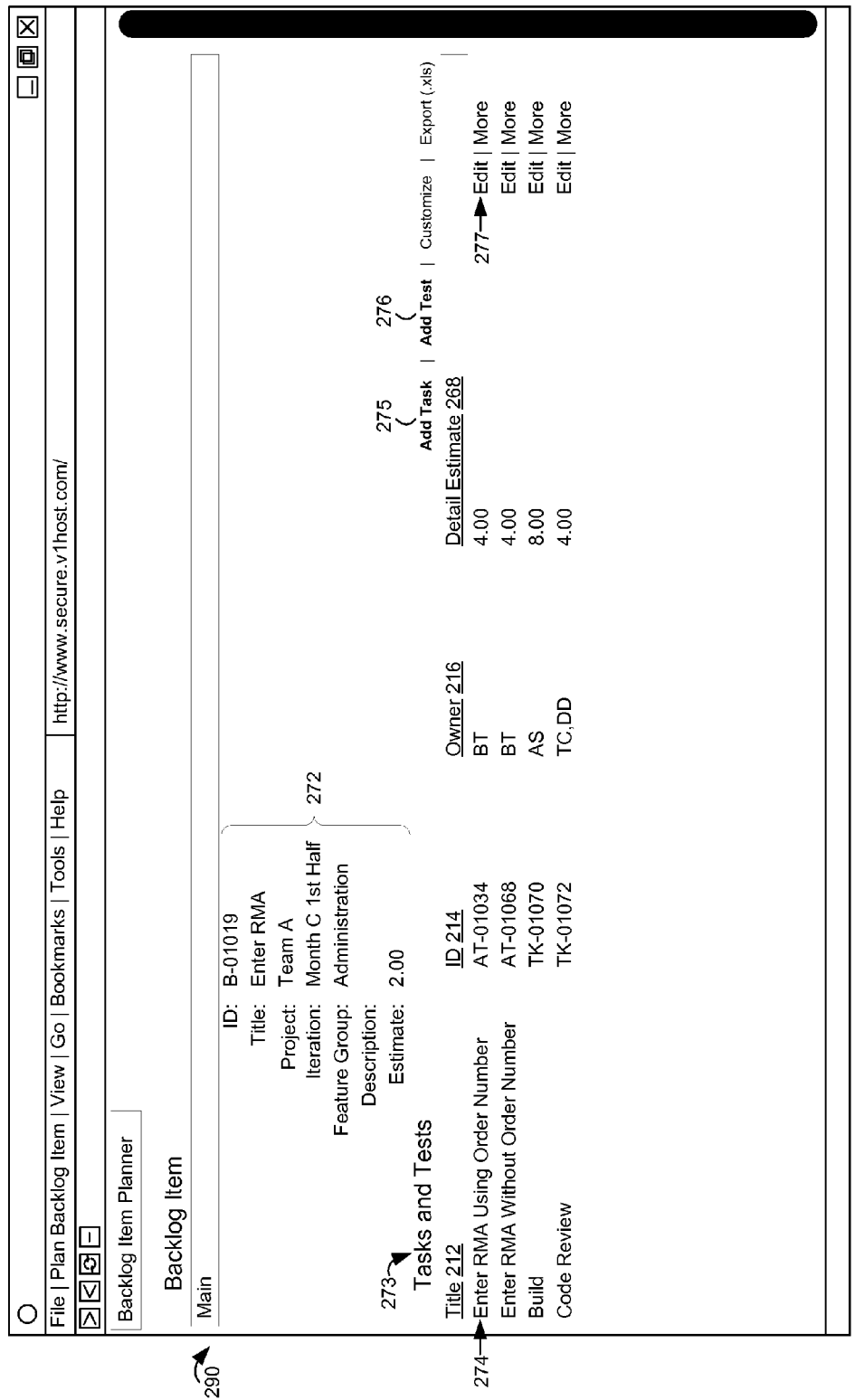
FIGS. 2C and 2D are schematic screenshots of a user interface for viewing an asset's attributes and related assets in accordance with some embodiments.
Figure 2D:
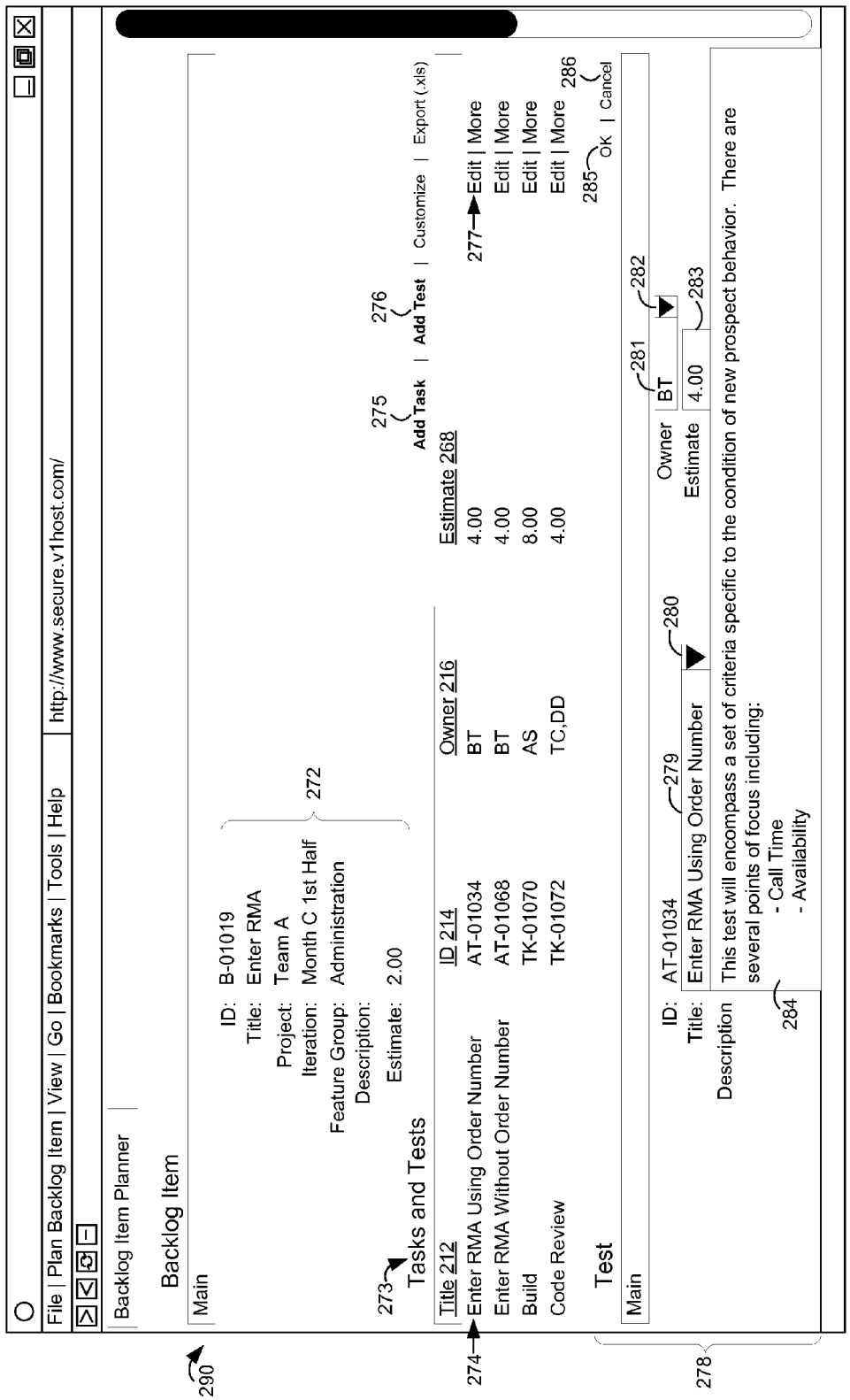

In some embodiments, an asset displayed in the group 262 may be edited by selecting a link corresponding to the asset, which results in display of a separate user interface (UI) for editing the asset. For example, selection of the "plan backlog item" link 271 for the "enter RMA" asset 264 results in display of a window 290 (FIG. 2C). ("Backlog item" in this context is a type of work item). The window 290 displays attributes 272 of the "enter RMA" asset 264, such as ID, title, project, iteration, feature group, description, and estimate. In some embodiments, the attributes are displayed in a list.

The window 290 also displays related assets 273 associated with the "enter RMA" asset 264. In this example, the related assets 273 include tasks and tests associated with the "enter RMA" asset 264, which is a feature. Attributes of the related assets 273 (e.g., title 212, ID 214, owner 216, and detail estimate 268) are displayed.

The related assets 273 may be edited by selecting a corresponding link. For example, related asset 274 ("Enter RMA Using Order Number") may be edited by selecting an "edit" link 277. In some embodiments, in response to selection of the "edit" link 277, a UI 278 (FIG. 2D) for editing the related asset 274 is displayed in the window 290 along with the attributes 272 and related assets 273. The UI 278 includes user input fields (e.g., 279, 281, 283, and 284) to display and receive edits to attributes of the related asset 274. In some embodiments, the UI 278 includes drop-down menus (e.g., 280, 282) to select values for attributes of the related asset 274. In some embodiments, the user may enter values directly into the user input fields. Edits may be applied by selecting the "OK" link 285 or canceled by selecting the "cancel" link 286. In some embodiments, upon selection of the "OK" link 285, display of the UI 278 is ceased and displayed attribute values for the edited related asset 274 are updated in response to the edits. The user then may select another edit link associated with another related asset, resulting in display of another UI 278 within the window 290 for displaying and editing the newly selected related asset. In some embodiments, multiple UI's for displaying and editing multiple respective related assets may be open simultaneously within the window 290 and may be accessed simply by scrolling within the window 290.

In some embodiments, a new related asset may be added via the window 290. For example, a new task or test for the "enter RMA" asset 264 may be added by selecting the "add task" link 275 or "add test" link 276. In some embodiments, selection of the "add task" link 275 or "add test" link 276 results in display, within the window 290, of a user interface analogous to UI 278 for which the user input fields (e.g., 279, 281, 283, and 284) are blank. The user may enter attribute values for the new task or test through the user input fields. In some embodiments, the user may specify attribute values via drop-down menus (e.g., 280, 282). In some embodiments, creation of the new task or test is completed by selecting the "OK" icon 285 or canceled by selecting the "cancel" icon 286. In some embodiments, upon selection of the "OK" icon 285, display of the UI for creating the new related asset is ceased and the new related asset is displayed among the related assets 273.

The window 290 thus provides a single integrated interface through which a user may view multiple levels of information for an asset in addition to performing edits. For example, the user may view attributes of the asset itself and of related assets, and may edit or create related assets. The integrated interface allows the user to perform these tasks without having to browse through a succession of windows.

Agile development management software can provide user interfaces for creating and tracking goals, as illustrated in FIGS. 2E-2H in accordance with some embodiments.

Figure 2E:
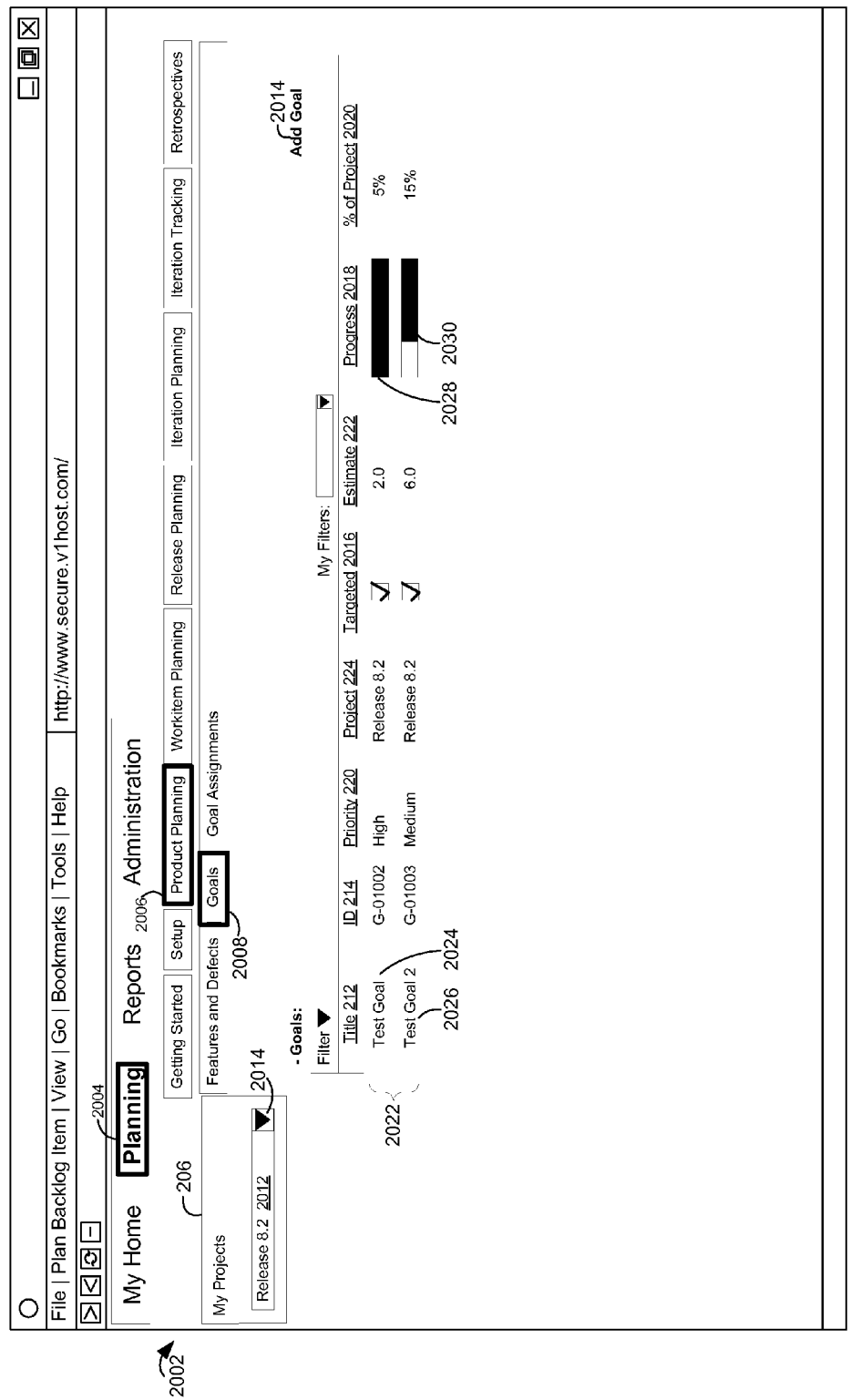
FIG. 2E is a schematic screenshot of a user interface displaying a list of goals in accordance with some embodiments.

FIG. 2E is a schematic screenshot of a user interface (UI) 2002 that displays a list 2022 of goals in accordance with some embodiments. In some embodiments, the user interface 2002 is accessed by selecting one or more menu items (e.g., "Planning" tab 2004, "Product Planning" tab 2006, and "Goals" tab 2008.) In some embodiments, the goals displayed in the list 2022 may be filtered by specifying a project hierarchy level (e.g., "Release 8.2" 2012) in the project selection window 206. For example, the user may select a project hierarchy level from a drop-down menu 2014.

The list 2022 displays various attributes of the listed goals, such as title 212, ID 214, priority 220, project 224, estimate 222, progress 2018, and percentage of project 2020. Estimate 222 provides an estimate of the time or amount of work required to complete the goal, in arbitrary units (e.g., worker days or worker hours). Thus, "Test Goal" 2024 is estimated to require 2.0 units of work to complete and "Test Goal 2" 2026 is estimated to require 6.0 units of work to complete. Progress 2018 provides an estimated degree of completion of a goal, which may be displayed using a bar chart (e.g., bar chart 2028 for "Test Goal" 2024 and 2030 for "Test Goal 2" 2026). Alternatively, the progress 2018 may be displayed as a percentage value of the estimated degree of completion. Percentage of project 2020 displays the percentage of a project's work (e.g., estimated work) accounted for by a particular goal.

In some embodiments, a goal may be defined for a top level in a project hierarchy (or may have a definition that does not specify a project hierarchy level), but may be specifically associated with one or more lower levels in the project hierarchy. The "Targeted" field 2016 in the UI 2002 indicates whether a respective goal in the list 2022 is specifically associated with a specified level in the project hierarchy. For example, goals 2024 and 2026 are specifically associated with, and thus targeted to, Release 8.2.

Figure 2F:
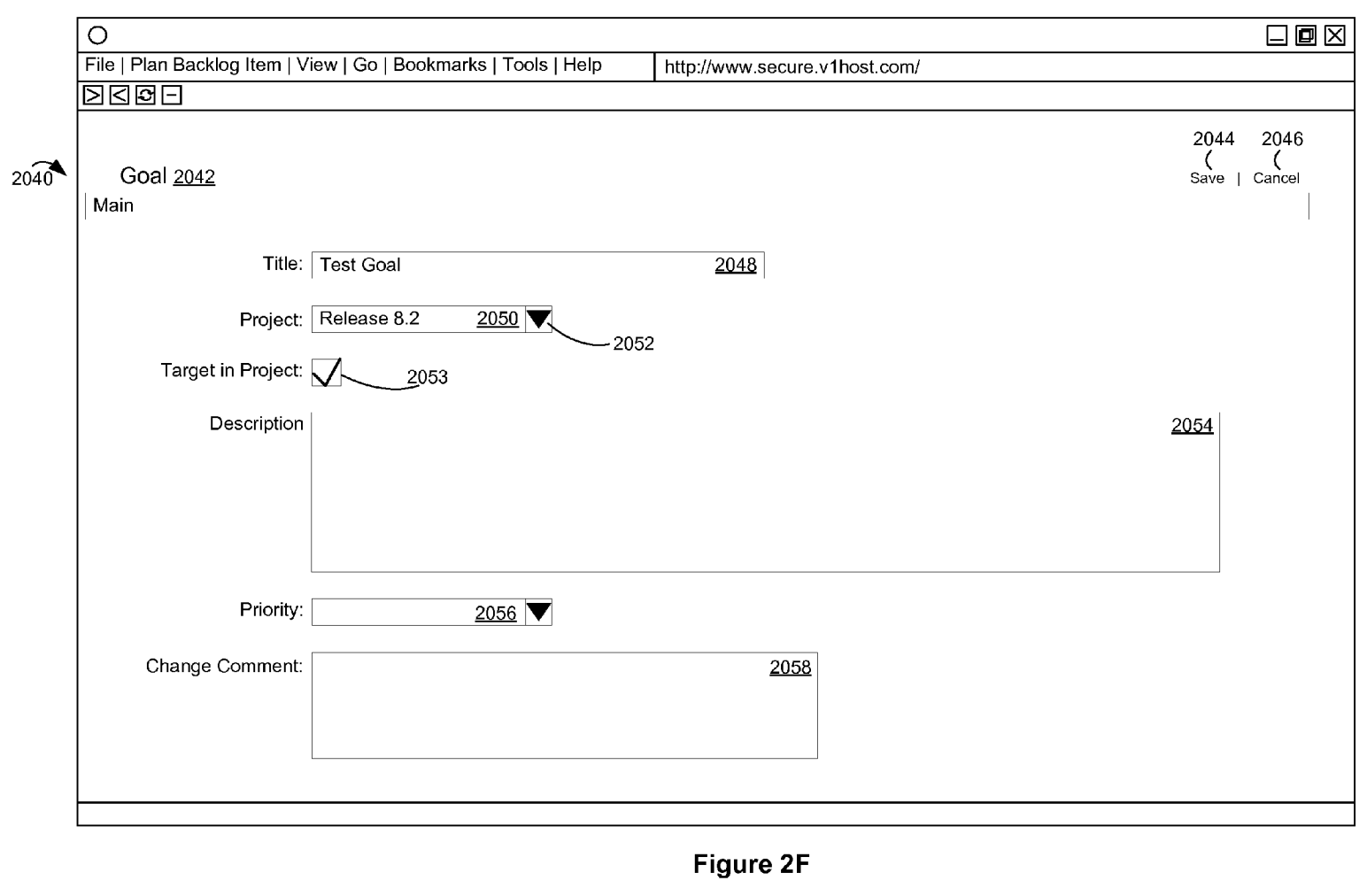

A new goal may be created and added to the list 2022 by selecting the "Add Goal" link 2014. In response, a goal creation UI 2040 is displayed, as illustrated in FIG. 2F in accordance with some embodiments. In some embodiments the UI 2040 or similar user interface also may be used to edit an existing goal. The goal creation UI 2040 includes various user input fields for specifying attributes of a goal 2042. Examples of the user input fields include:

- a title field 2048 for specifying the title 212 (FIG. 2E) of the goal;
- a project field 2050 for specifying a project hierarchy level 224 (FIG. 2E) with which the goal is associated, which may be selected from a drop-down menu 2052;
- a "Target in Project" field 2053 to indicate whether the goal is targeted to a project hierarchy level 224;
- a description field 2054 for entering a description of the goal;
- a priority field 2056 for specifying a priority 220 (FIG. 2E) for the goal;
- a change comment field 2058 for entering user comments; and
- other fields (not shown) for entering other attributes of the goal 2042.

The user may save the goal 2042 by selecting the "Save" link 2044 and may cancel goal creation by selecting the "Cancel" link 2046.

Figure 2G:
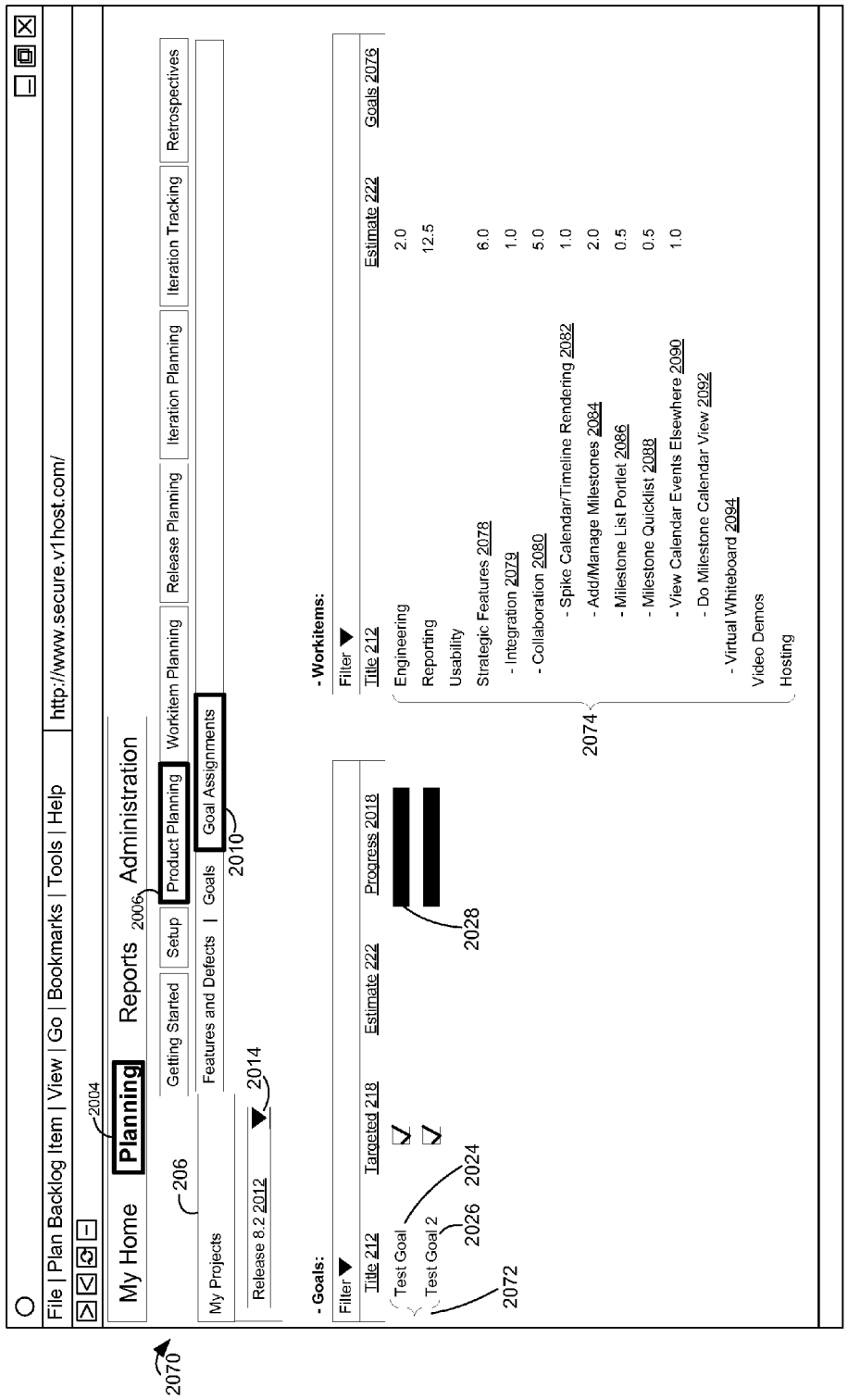
FIGS. 2G and 2H are schematic screenshots of a user interface for assigning work items to goals in accordance with some embodiments.

Once a goal has been created, work items may be assigned to the goal. FIG. 2G is a schematic screenshot of a user interface 2070 for assigning work items to goals in accordance with some embodiments. The UI 2070 may be accessed, for example, by selecting the "Goal Assignments" tab 2010 or other appropriate menu items. The UI 2070 displays a list 2072 of goals (e.g., "Test Goal" 2024 and "Test Goal 2" 2026), which may be filtered by a project hierarchy level specified in the project selection window 206. No work estimate 222 values are shown for the goals 2024 and 2026, indicating that no work items have yet been assigned to the goals 2024 and 2026 (or that the only work items to have been assigned to the goals 2024 and 2026 do not have work estimates).

The UI 2070 also displays a list 2074 of work items available for assignment to a goal. The list 2074 includes fields for various attributes of the work items, such as title 212, estimate 222, and goals 2076. If a work item were assigned to a goal, the title 212 of the goal would be displayed in the goals field 2076. The list 2074 is hierarchical: it includes multiple levels of work items. For example, "Strategic Features" 2078 is a feature group that includes other feature groups (i.e., "Integration" 2079, "Collaboration" 2080, and "Virtual Whiteboard" 2094). The "Collaboration" feature group 2080 in turn includes features 2082-2092, each of which may include multiple tasks and/or tests (not shown, but in some embodiments tasks and tests also may be displayed in the list 2074). The work estimate 222 for "Collaboration" 2080 is a roll-up of the work estimates 222 for the features 2082-2092: these work estimates 222 sum to 5.0, which is the work estimate 222 for "Collaboration" 2080.

Figure 2H:
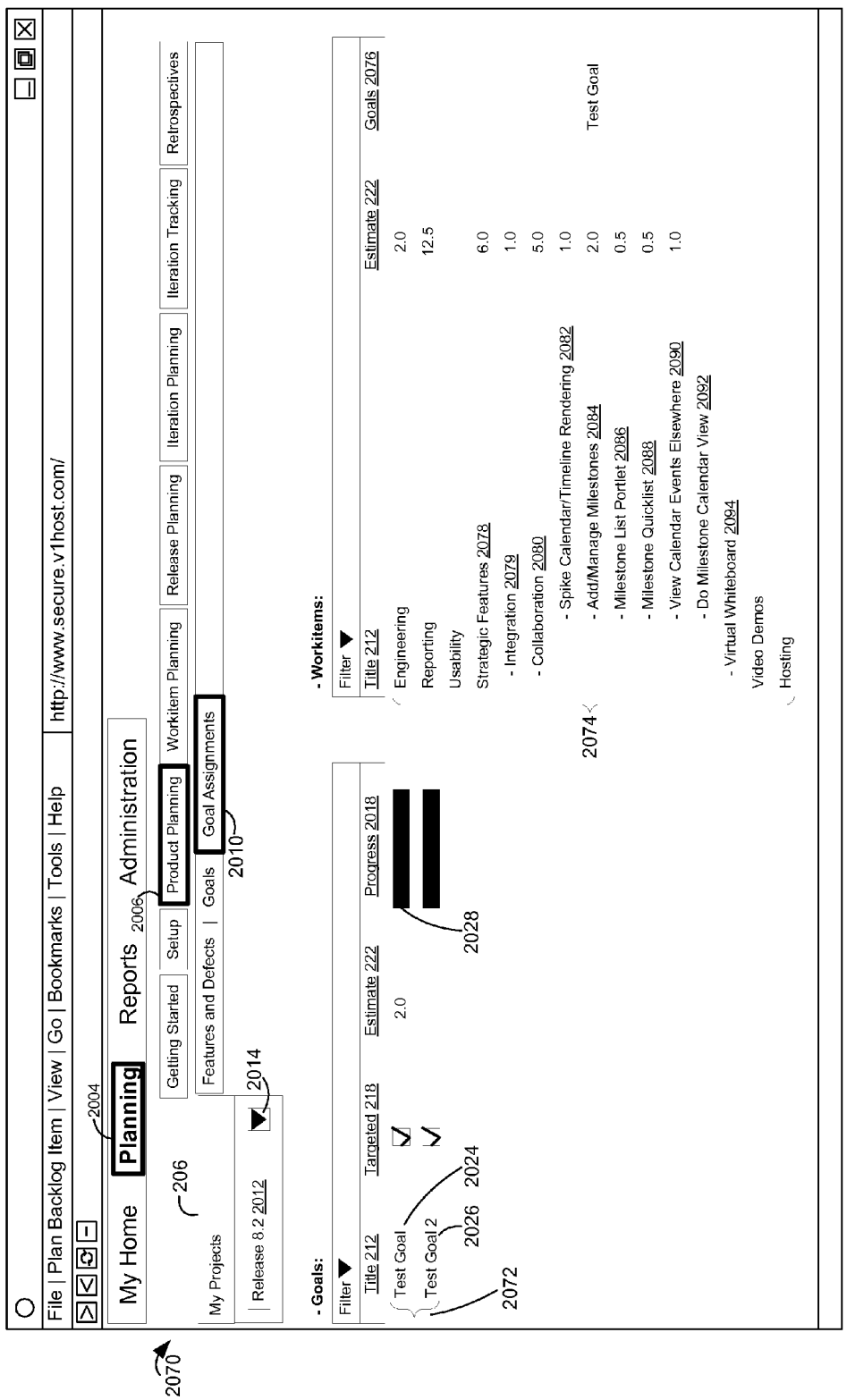

A work item displayed in the list 2074 may be selected and assigned to a goal in the list 2072. For example, a user may drag-and-drop a work item (e.g., the "Add/Manage Milestones" feature 2084) from the list 2074 onto a goal (e.g., "Test Goal" 2024). The result of this action is illustrated in FIG. 2H: "Add/Manage Milestones" 2084 has been assigned to "Test Goal" 2024, as indicated in the goals field 2076 of "Test Goal" 2024, and the work estimate field 222 of "Test Goal" 2024 has been updated to display the work estimate for "Add/Manage Milestones" 2084. The degree of completion displayed in the progress field 2018 of "Test Goal" 2024 also may be updated to reflect a degree of completion of "Add/Manage Milestones" 2084. In the example of FIG. 2H, the progress bar 2028 is entirely blank (as indicated by the black fill), indicating that no progress has been made toward completing the "Add/Manage Milestones" feature 2084.

The UI 2070 allows the user to specify multiple work items for assignment to a goal. Work items assigned to a goal may be of different types: for example, feature groups, features, defects, tasks, and/or tests all may be assigned to the same goal. Thus, in some embodiments, a goal is a hierarchical set of work items. In some embodiments, however, while features and/or defects may be assigned to a goal, individual tasks and tests are not available for assignment to the goal. Furthermore, the work items assigned to a goal may be unrelated: for example, if a first feature group, first feature, and first task are assigned to a goal, the first feature may be part of a different feature group than the first feature group, and the first task may be part of a feature that is distinct from the first feature and is not included in the first feature group. The work items assigned to a goal also may be associated with distinct levels in a project hierarchy, such as distinct projects, subprojects, releases, teams, clients, customers, and/or vendors. The goal provides roll-ups of the work estimates and degrees of completion for the work items assigned to the goal.

Figure 2I:
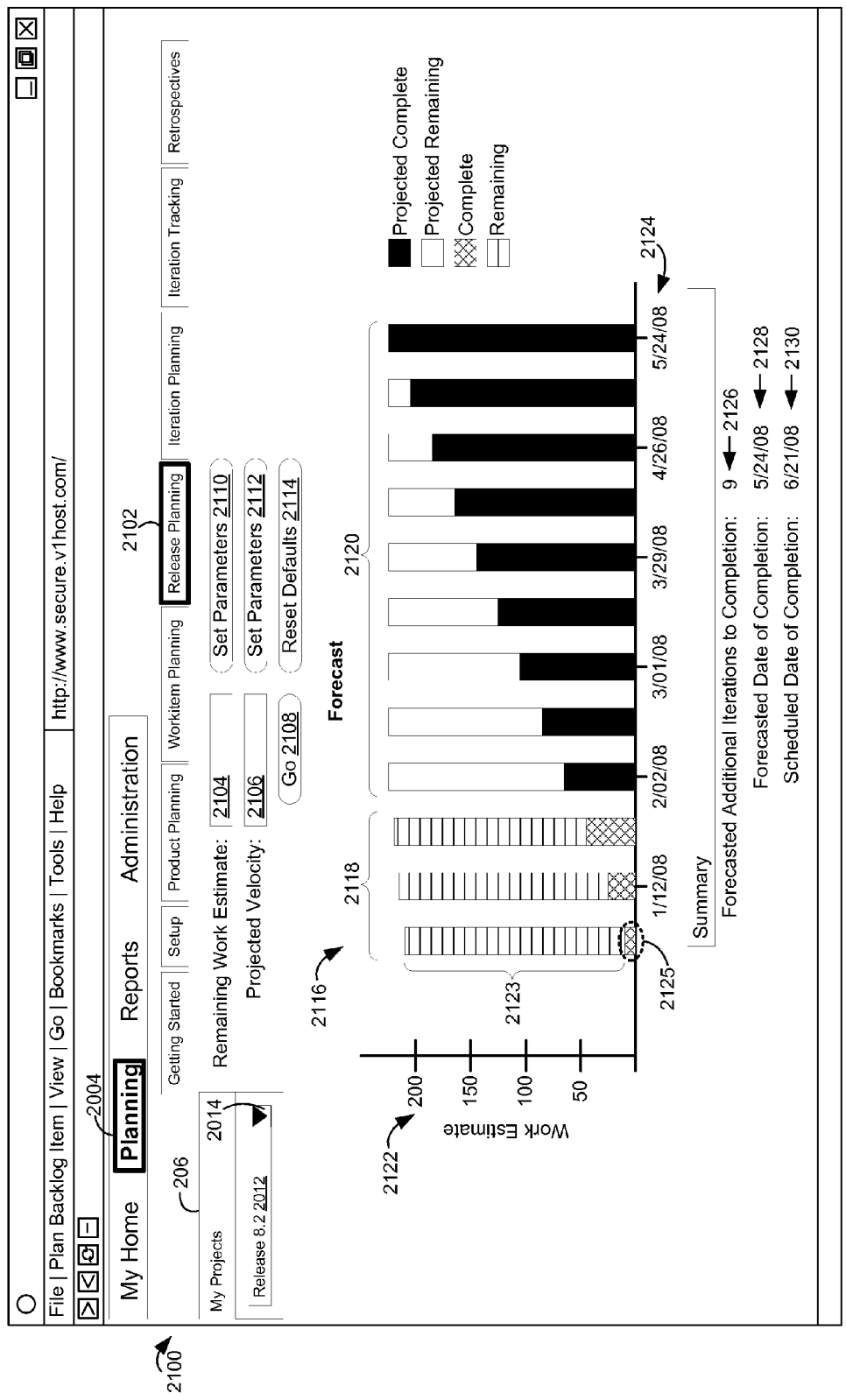
FIGS. 2I-2K are schematic screenshots of a user interface for performing project schedule forecasting in accordance with some embodiments.

Attention is now directed to user interfaces for performing project schedule forecasting such as release forecasting. FIG. 2I is a schematic screenshot of a UI 2100 for performing project schedule forecasting in accordance with some embodiments. In some embodiments, the UI 2100 is accessed by selecting one or more menu items (e.g., "Planning" tab 2004 and "Release Planning" tab 2102). A project selection window 206 in the UI 2100 allows the user to select a project hierarchy level (e.g., "Release 8.2" 2012) from a drop-down menu 2014. A graph 2116 is displayed showing work estimates 2122 versus dates 2124 for the selected project hierarchy level 2012. Each bar in the graph 2116 displays estimates of completed and remaining work, measured in arbitrary units (e.g., man-hours or man-days), for a respective period of time. In some embodiments, each respective period of time corresponds in turn to a respective iteration. For example, in FIG. 2I each bar in the graph 2116 corresponds to a distinct 2-week iteration.

The graph 2116 includes a group of bars 2118 displaying historical work estimate data for the selected project hierarchy level 2012. Each bar in the group 2118 displays both completed work estimates 2125 and remaining work estimates 2123 for a respective historical (i.e., past) period of time. The sum of the completed work and remaining work estimates, which corresponds to the height of the bar, gives the total work estimate. The increase in total work estimate over time for bars in the group 2118 indicates that the work estimates were updated over time (e.g., to reflect anticipated project delays).

The graph 2116 also includes a group of bars 2120 displaying estimates of complete and remaining work for successive future time periods for the selected project hierarchy level 2012, wherein each bar corresponds to a respective future time period. Again, the sum of the completed and remaining work estimates for each time period gives the total work estimate. The ratio of the estimate of completed work to the total work estimate for each time period gives an estimated degree of completion of work items for that time period. The final bar in the group 2120, corresponding to an iteration ending on May 24, 2008, has a 100% degree and thus indicates that May 24, 2008 is the estimated time of completion of work items associated with the selected project hierarchy level 2012. Summary information below the graph 2116 also displays May 24, 2008 as the estimated time of completion 2128, which may be compared against the previously scheduled time of completion 2130. The summary information also displays a forecasted number of additional iterations 2126 required to reach the time of completion In general, data displayed by the group of bars 2120 are based on work estimate values for a specified plurality of work items and on a velocity value based on historical work completion data. For example, the number of remaining iterations, and thus the time to completion, may be calculated by dividing the remaining work estimate by the velocity value. Degrees of completion for successive future time periods may be extrapolated based on the velocity value and a current degree of completion. For example, degrees of completion for successive future time periods may be calculated by assuming a constant future velocity (e.g., equal to the velocity value) and thus a linear increase in the degree of completion over time. Alternatively, future degrees of completion may be calculated by extrapolating using a nonlinear model in accordance with the current degree of completion and the velocity value.

Data displayed by the group of bars 2118 are based on historical data stored for time periods corresponding to the bars in the group 2118, including historical work estimates and historical work completion data for the specified plurality of work items during the time periods.

In some embodiments, when the user initially accesses the UI 2100 and selects a project hierarchy level 2012, the graph 2116 displays data that is determined based on default values for the selected project hierarchy level 2012. For example, the default work estimate used to generate the group of bars 2120 may be the combined or rolled-up work estimates of every work item associated with the selected project hierarchy level 2012. The default velocity used to generate the group of bars 2120 may be the average historical velocity of all teams associated with the selected project hierarchy level 2012.

The UI 2100 allows the user to perform on-the-fly forecasting experiments by varying the estimate of remaining work and/or the project velocity, in response to which the graph 2116 is automatically regenerated. For example, the user may enter a remaining work estimate in the user input field 2104 and may enter a projected velocity in the user input field 2106, and then may select (e.g., click on) the Go button 2108. In response, the graph 2116 and summary information 2126 and 2128 are updated to reflect the value(s) entered by the user. The updated graph 2116 displays an estimate time of completion and estimated degrees of completion over time for the work estimate and velocity entered in the fields 2104 and 2106 respectively. In some embodiments, the Go button 2108 is omitted and the graph 2116 is regenerated each time a new value is entered in a user input field 2104 or 2106.

Instead of directly entering a remaining work estimate in the user input field 2104, the user may specify a plurality of work items having respective work estimates. In response, the graph 2116 is automatically regenerated, such that the estimated time of completion and degrees of completion displayed by the graph are based on a roll-up of work estimates for the specified plurality of work items in accordance with a currently specified velocity value. To specify the plurality of work items, the user selects (e.g., clicks on) the Set Parameters button 2110 next to the Remaining Work Estimate input field 2104, in response to which a menu 2132 (FIG. 2J) is displayed. The menu 2132 allows the user to specify criteria (e.g., work item attributes) that identify the plurality of work items. For example, the menu 2132 includes a Workitem input field 2134 that allows the user to select a group of work items, a Priority input field 2138 that allows the user to select a work item priority value, a Team input field 2140 that allows the user to select a team with which work items are associated, and Status check-boxes 2136 that allow the user to select work item status values. The menu 2132 may include other input fields for specifying other work item attributes besides those shown in FIG. 2J. For example, an input field may allow specification of a version of respective work items, wherein each version of a respective work item has a distinct work estimate. In some embodiments, one or more input fields in the menu 2132 are implemented as drop-down menus. In some embodiments, the menu 2132 allows the user to specify more than one value for respective criteria (e.g., for respective work item attributes).

The project management software identifies work items that satisfy the criteria provided by the user in the menu 2132 and regenerates the graph 2116 accordingly. For example, the project management software retrieves work items that satisfy the provided criteria from the asset data 412 in the database 410 (FIG. 4) and calculates a roll-up of work estimates for the retrieved work items; this roll-up is used as the remaining work estimate to regenerate the graph 2116. In some embodiments, summary data 2126, 2128, and/or 2130 also are regenerated in response to changes to criteria in the menu 2132. The user may repeatedly vary the criteria provided via the menu 2132, in an on-the-fly manner, to explore different possible forecasted times of completion for different pluralities of work items.

Instead of directly entering a projected velocity in the user input field 2106, the user may specify work item attributes that reference historical work completion data. In response, a new velocity value is determined in accordance with the historical work completion data referenced by the user-specified work item attributes. The graph 2116 is automatically regenerated to display the estimated time of completion and degrees of completion in accordance with the new velocity value. To specify the work item attributes, the user selects (e.g., clicks on) the Set Parameters button 2112 (FIG. 2I) next to the Projected Velocity input field 2106, in response to which a menu 2150 (FIG. 2K) is displayed. The menu 2150 allows the user to specify criteria (e.g., work item attributes and a statistical metric) that reference the historical work completion data. For example, the menu 2150 includes a Team field 2152 for selecting a team, a Start Iteration field 2154 for selecting a first historical iteration, a Stop Iteration field 2156 for selecting a second historical iteration, and a Mode input field for specifying a statistical metric to be used to determine the new velocity value. The iterations specified in the Start and Stop Iteration fields 2154 and 2156 together specify an historical period of time. Statistical metrics include, for example, average velocity (e.g., mean, median or mode), highest velocity, or lowest velocity for the specified team(s) with the specified historical period of time. The menu 2150 may include other input fields for specifying other work item attributes besides those shown in FIG. 2K. In some embodiments, one or more input fields in the menu 2150 are implemented as drop-down menus. In some embodiments, the menu 2150 allows the user to specify more than one value for respective criteria (e.g., for respective work item attributes).

Figure 4:
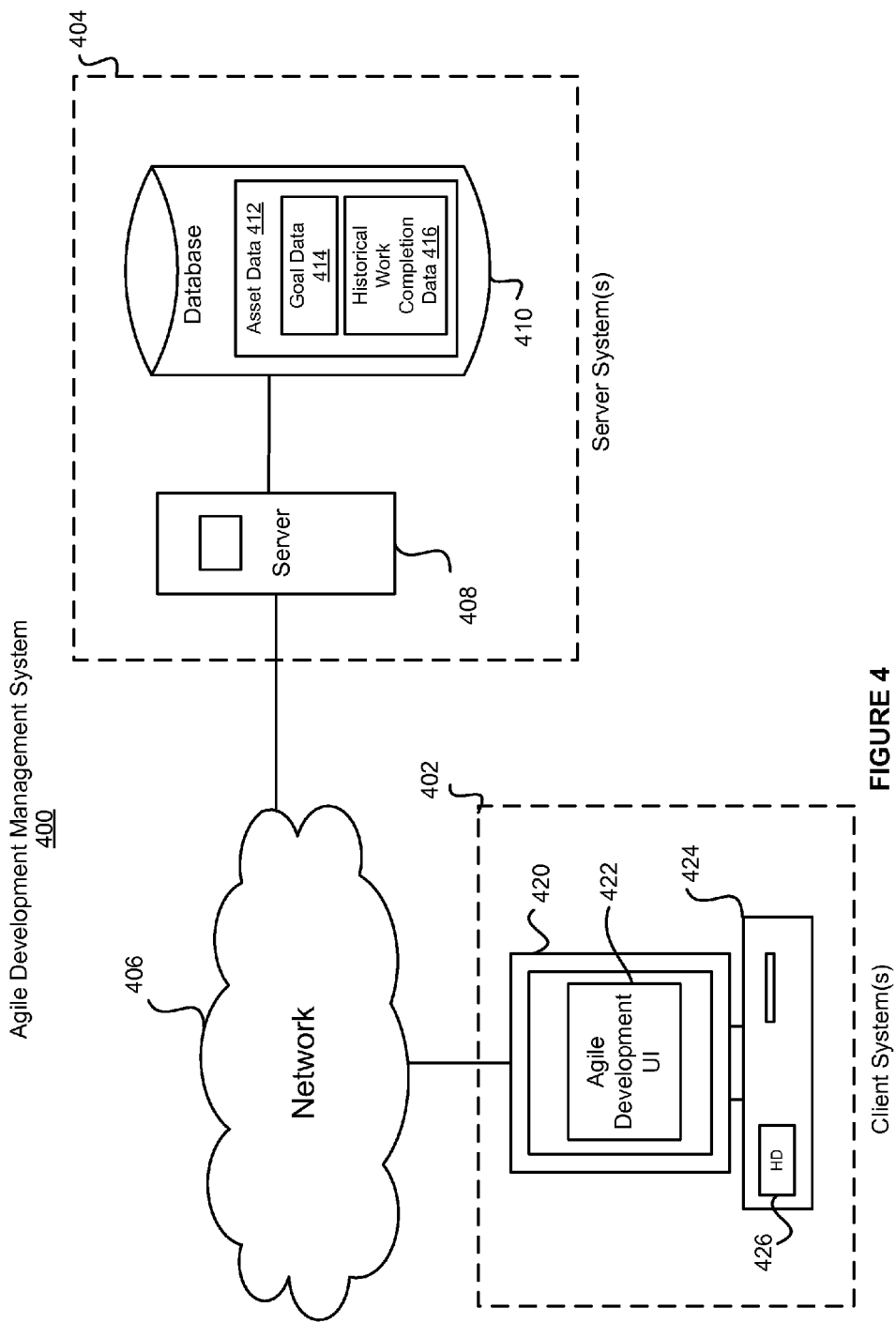
FIG. 4 is a block diagram illustrating an agile development management system in accordance with some embodiments.

The project management software identifies historical work completion data referenced by the criteria provided in the menu 2150, determines a velocity value based on the referenced data, and regenerates the graph 2116 accordingly. For example, the project management software retrieves work items that satisfy the provided criteria from historical work completion data 416 in a database 410 (FIG. 4). The retrieved work items are then used to calculate a velocity value based on records in the database 410 indicating a rate or rates of completion of the retrieved work items (e.g., by calculating the total amount of estimated work completed per iteration for the retrieved work items). In some embodiments, the retrieved work items are used to generate a population of velocities (e.g., different velocities for different iterations) to which the statistical metric is then applied. Alternatively, a rate of work completion may be separately calculated for each retrieved work item based on recorded time to complete the work item, resulting in a population of work completion rates to which the statistical metric is then applied, resulting in a final work completion rate used to regenerate the graph.

In some embodiments, summary data 2126, 2128, and/or 2130 also are regenerated in response to changes to criteria in the menus 2132 and/or 2150. The user may repeatedly vary the criteria provided via the menus 2132 and/or 2150, in an on-the-fly manner, to explore different possible forecasted times of completion for different pluralities of work items and different rates of work completion (e.g., different velocities).

In some embodiments, the UI 2100 allows the user to save and later recall graphs 2116 associated with various scenarios specified using input fields and/or menus 2104, 2106, 2110, and/or 2112 (e.g., using Save Scenario and Recall Scenario icons, not shown).

In the menus 2132 and 2150, selection of an OK option 2142 or 2160 approves entered criteria, selection of a Reset option 2144 or 2162 restores default values, and selection of a Cancel option 2146 or 2164 cancels entry of criteria into the various input fields.

FIGS. 3A-3F are flow diagrams illustrating a method 300 of performing project schedule forecasting based on stored project data in accordance with some embodiments.

Figure 2J:
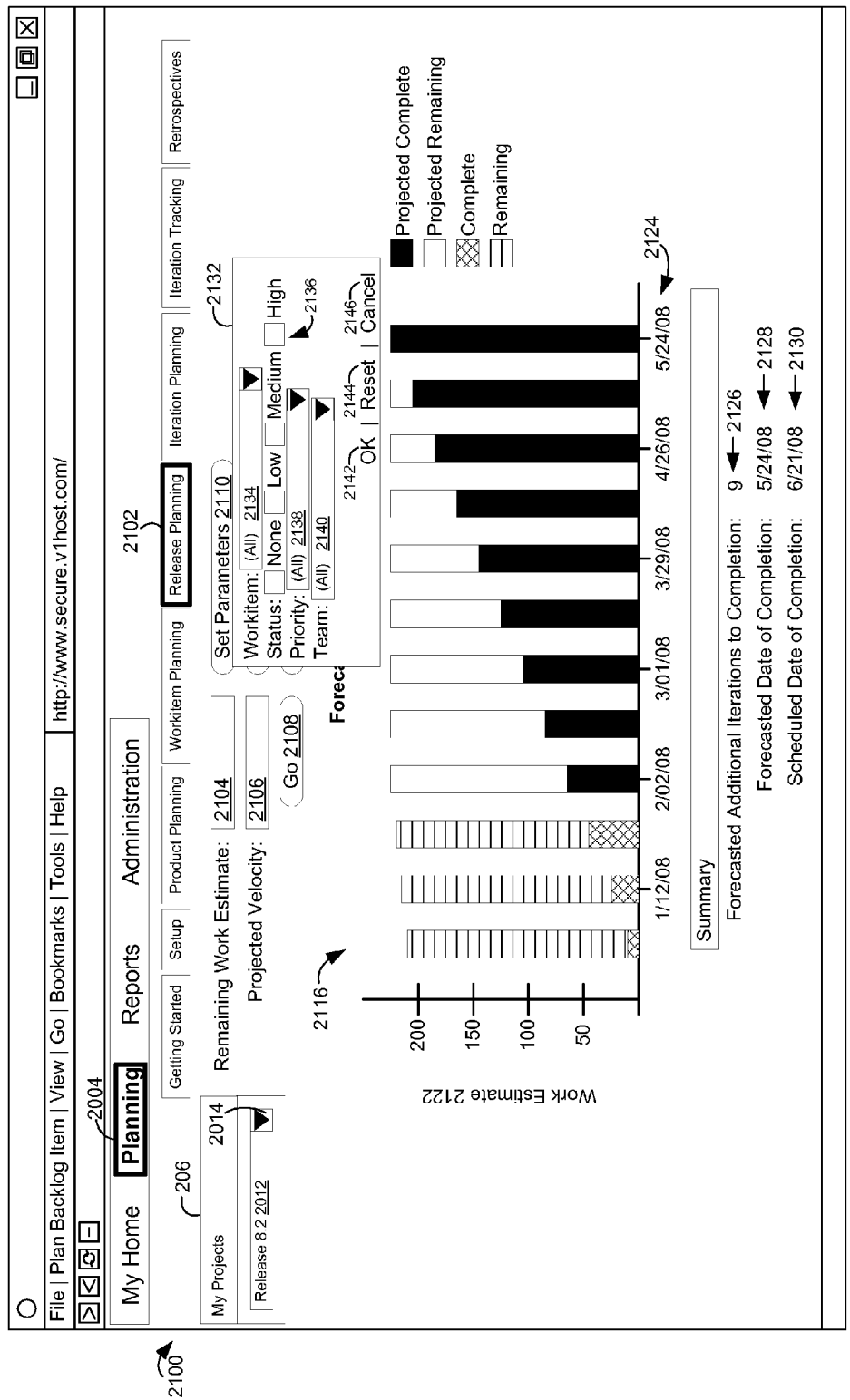

In the method 300, a first user input (e.g., selecting a project hierarchy level 2012 in the window 206 and/or specifying one or more criteria in the menu 2132, FIG. 2J) is received (302) selecting a first plurality of work items in a project. Respective work items of the first plurality have respective work estimates. In some embodiments, the respective work estimates comprise estimates of remaining work for respective work items of the first plurality. In some embodiments, the first user input specifies one or more of a status of respective work items of the first plurality (e.g., via check-boxes 2136, FIG. 2J), a team to which respective work items of the first plurality are assigned (e.g., via input field 2140, FIG. 2J), a priority of respective work items of the first plurality (e.g., via input field 2138, FIG. 2J), and a defined group of work items (e.g., a feature group) with which respective work items of the first plurality are associated (e.g., via input field 2134, FIG. 2J). In some embodiments, the first user input specifies multiple statuses, teams, priorities, and/or defined groups of work items (e.g., feature groups). In some embodiments, the defined groups of work items (e.g., feature groups) are associated with an agile software development process.

Figure 2K:
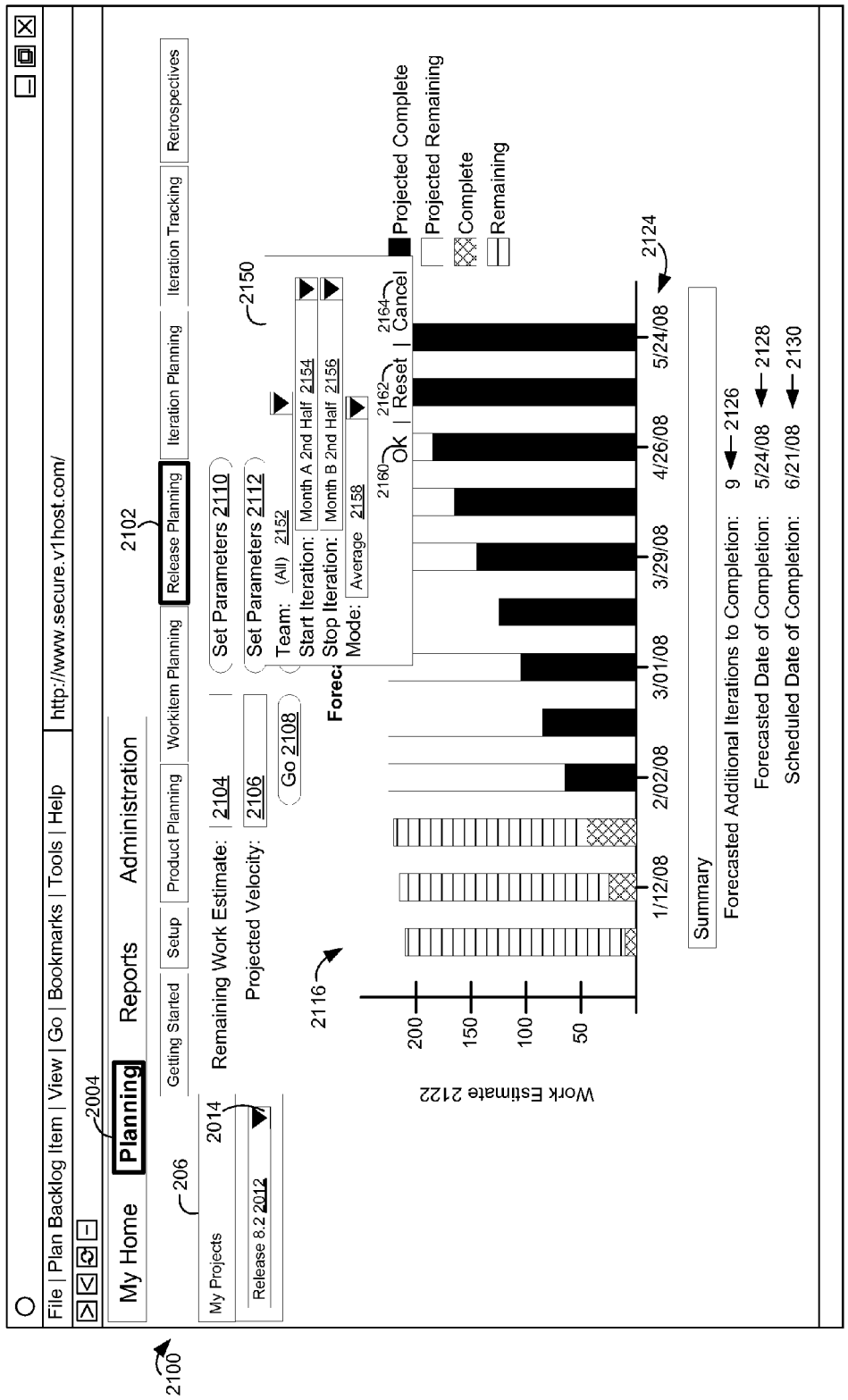

A second user input is received (304) specifying one or more first work item attributes referencing historical work completion data (e.g., specifying one or more attributes in the menu 2150, FIG. 2K). In some embodiments, the second user input specifies one or more of a team (e.g., via input field 2152, FIG. 2K), an historical period of time (e.g., via input fields 2154 and 2156, FIG. 2K), and a statistical metric (e.g., via input field 2158, FIG. 2K). In some embodiments, the second input specifies multiple teams and/or historical periods of time. Examples of an historical period of time include but are not limited to a range of past dates, a completed iteration, a range of completed iterations (e.g., as specified in the input fields 2154 and 2156), a period of time associated with a completed product release, and a period of time associated with a range of completed product releases. Examples of a statistical metric include but are not limited to an average (e.g., mean, median, or mode) rate of work completion, an above-average rate of work completion, and a below-average rate of work completion. In some embodiments, the above-average rate of work completion is the highest rate of work completion in a population of work completion rates or is a rate of work completion at a specified percentile or number of standard deviations above the mean in the population of work completion rates. In some embodiments, the below-average rate of work completion is the lowest rate of work completion in a population of work completion rates or is a rate of work completion at a specified percentile or number of standard deviations below the mean in the population of work completion rates.

A first historical rate of work completion is determined (306) in accordance with the historical work completion data referenced by the one or more first work item attributes (e.g., as described above with regard to FIG. 2K). An estimated time of completion of the first plurality of work items is calculated (308) in accordance with the first historical rate of work completion. For example, the estimated time of completion is calculated by dividing the remaining work estimate by the first historical rate of work completion.

The estimated time of completion of the first plurality of work items is provided (310) for display (e.g., in the graph 2116 and/or as the forecasted date of completion 2128, FIG. 2I). In some embodiments, a previously scheduled time of completion (e.g., scheduled date of completion 2130, FIG. 2I) of the first plurality of work items is also provided (312) for display, for comparison to the estimated time of completion.

In some embodiments, the first plurality of work items corresponds to a first goal in the project and the estimated time of completion of the first plurality of work items provides an estimated time of completion of the first goal. In some embodiments, the first plurality of work items corresponds to a product release and the estimated time of completion of the first plurality of work items provides an estimated date for the product release.

For embodiments in which the second user input specifies one or more teams (e.g., via input field 2152, FIG. 2K), the first historical rate of work completion is calculated based on historical work completion data for the one or more teams. For embodiments in which the second user input specifies one or more historical periods of time (e.g., via input fields 2154 and 2156, FIG. 2K), the first historical rate of work completion is calculated based on historical work completion data during the one or more historical periods of time. For embodiments in which the second user input specifies a statistical metric (e.g., via input field 2158, FIG. 2K), the first historical rate of work completion is calculated based on historical work completion data in accordance with the first statistical metric.

If the second user input specifies both (1) one or more teams and (2) one or more historical periods of time, the first historical rate of work completion is calculated based on the historical work completion data for the one or more teams during the one or more historical periods of time. If the second user input specifies both (1) one or more teams and (2) a statistical metric, the first historical rate of work completion is calculated based on the historical work completion data for the one or more teams in accordance with the statistical metric. If the second user input specifies both (1) one or more historical periods of time and (2) a statistical metric, the first historical rate of work completion is calculated based on the historical work completion data during the one or more historical periods of time in accordance with the statistical metric. If the second user input specifies (1) one or more teams, (2) one or more historical periods of time, and (3) a statistical metric, the first historical rate of work completion is calculated based on the historical work completion data for the one or more teams during the one or more historical periods of time in accordance with the first statistical metric.

Figure 3A:
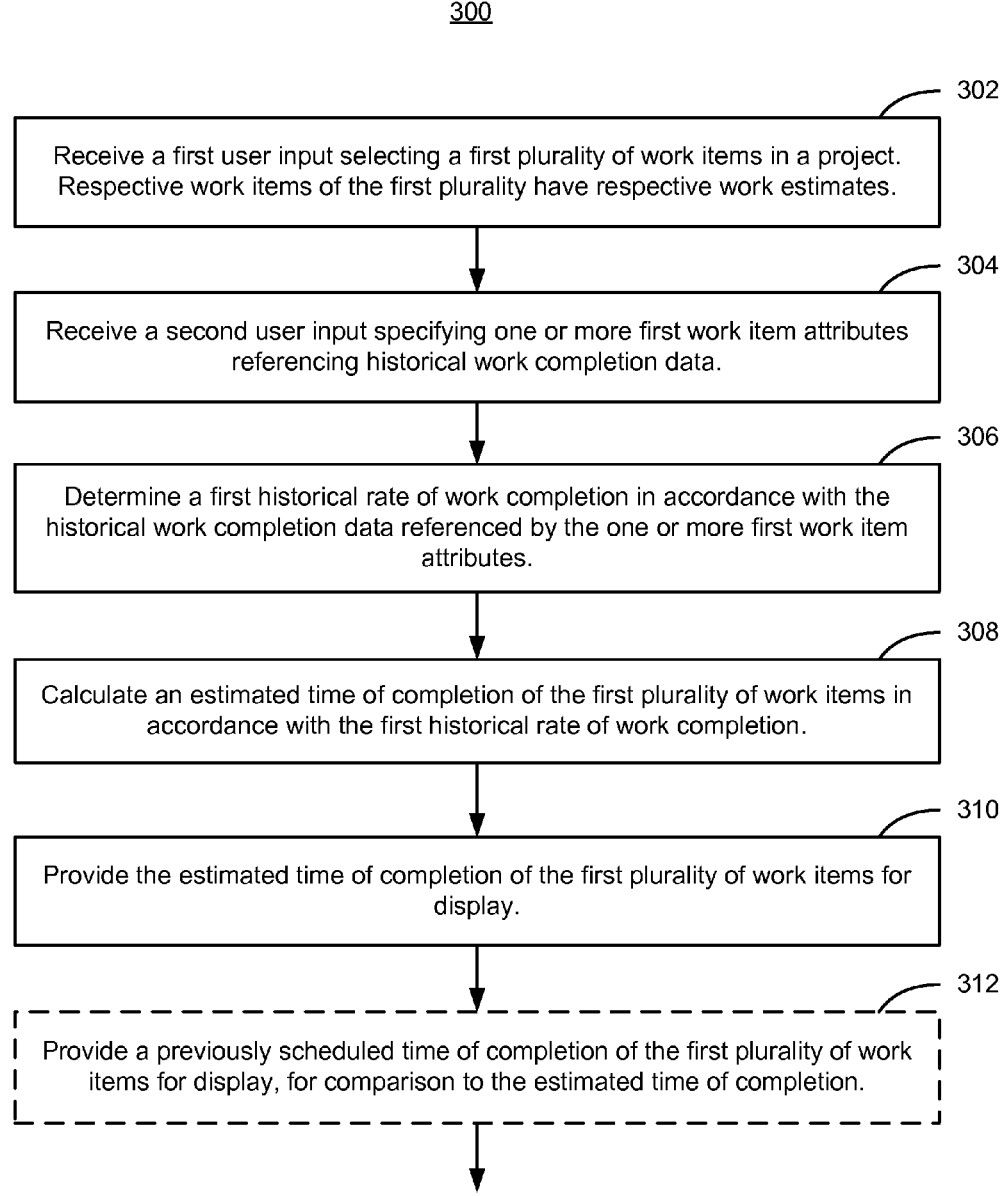
FIGS. 3A-3F are flow diagrams illustrating a method of performing project schedule forecasting based on stored project data in accordance with some embodiments.
Figure 3B:
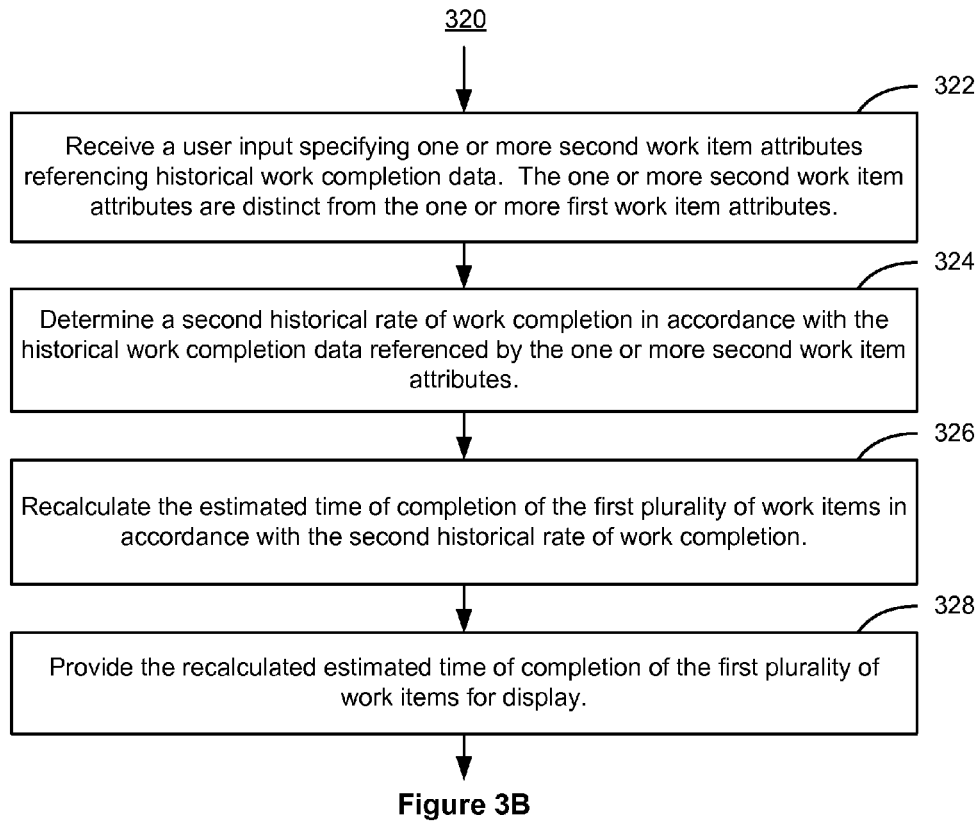

In some embodiments, the method 300 further includes the method 320 illustrated in FIG. 3B. In the method 320, a user input is received (322) (e.g., via the menu 2150, FIG. 2K) specifying one or more second work item attributes referencing historical work completion data. The one or more second work item attributes are distinct from the one or more first work item attributes. A second historical rate of work completion is determined (324) in accordance with the historical work completion data referenced by the one or more second work item attributes. Operations 322 and 324 may be performed as described for operations 304 and 306 (FIG. 3A) respectively.

The estimated time of completion of the first plurality of work items is recalculated (326) in accordance with the second historical rate of work completion. The recalculated estimated time of completion of the first plurality of work items is provided (328) for display (e.g., in the graph 2116 and/or as the forecasted date of completion 2128, FIG. 2I).

In some embodiments, the user input of operation 322 specifies a second team (e.g., distinct from a first team specified by the second user input of operation 304, FIG. 3A) and the second historical rate of work completion is determined (324) in accordance with historical work completion data for the second team. In some embodiments, the user input of operation 322 specifies a second historical period of time (e.g., distinct from a first historical period of time specified by the second user input of operation 304, FIG. 3A) and the second historical rate of work completion is determined (324) in accordance with historical work completion data during the second historical period of time. In some embodiments, the user input of operation 322 specifies a second statistical metric (e.g., distinct from a first statistical metric specified by the second user input of operation 304, FIG. 3A) and the second historical rate of work completion is determined (324) in accordance with the second statistical metric.

Figure 3C:
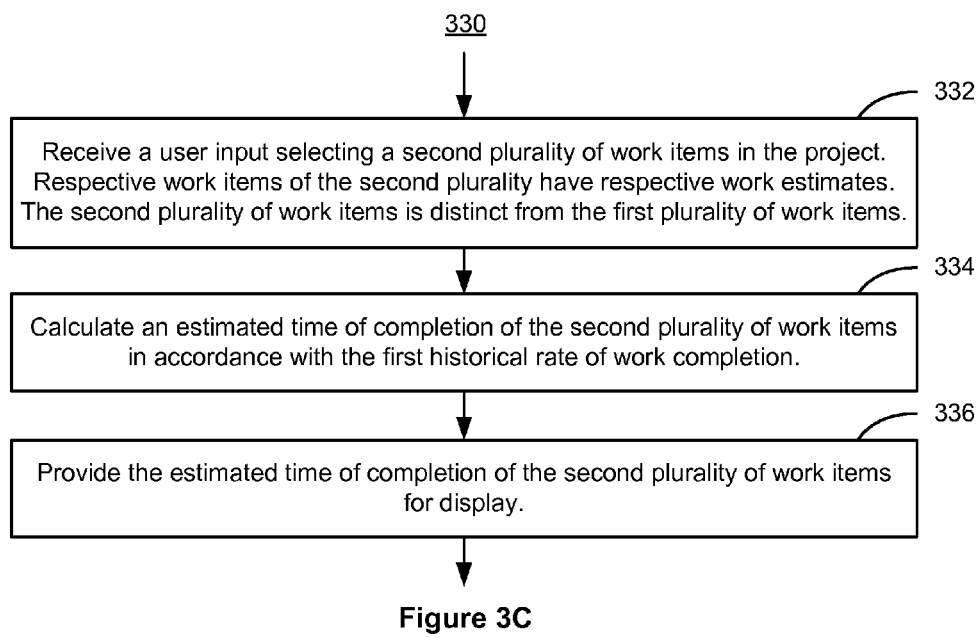

In some embodiments, the method 300 further includes the method 330 illustrated in FIG. 3C. In the method 330, a user input is received (332) (e.g., via the menu 2132, FIG. 2J) selecting a second plurality of work items in the project. Respective work items of the second plurality have respective work estimates. The second plurality of work items is distinct from the first plurality of work items.

An estimated time of completion of the second plurality of work items is calculated (334) in accordance with the first historical rate of work completion and provided (336) for display (e.g., in the graph 2116 and/or as the forecasted date of completion 2128, FIG. 2I).

Figure 3D:
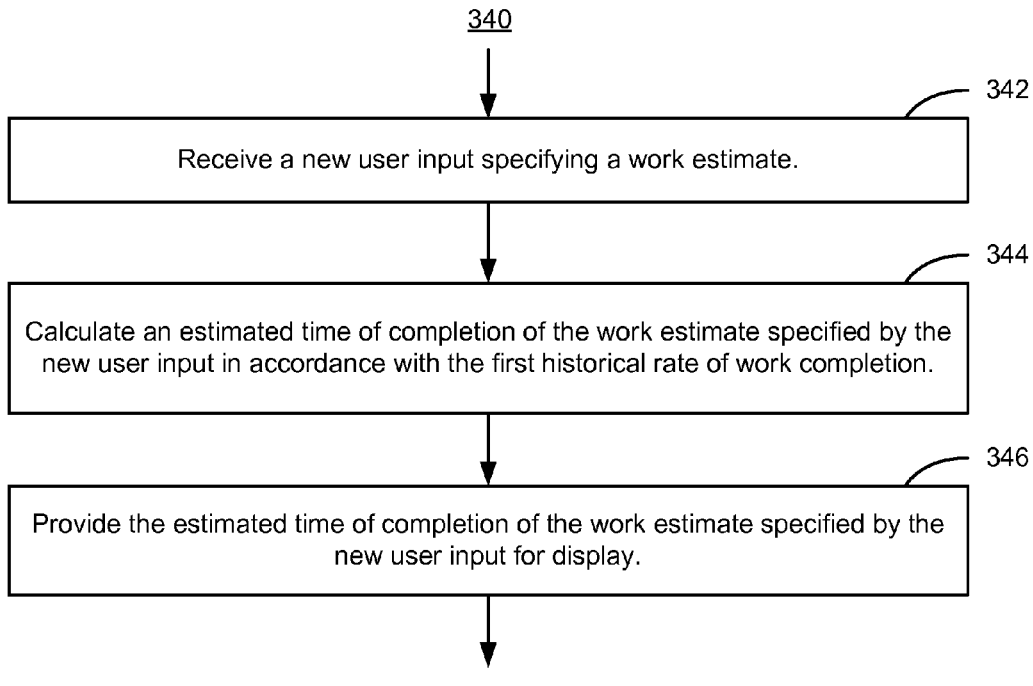

In some embodiments, the method 300 further includes the method 340 illustrated in FIG. 3D. In the method 340, a new user input specifying a work estimate is received (342) (e.g., via the input field 2104, FIG. 2I). An estimated time of completion of the work estimate specified by the third user input is calculated (344) in accordance with the first historical rate of work completion and provided for display (346) (e.g., in the graph 2116 and/or as the forecasted date of completion 2128, FIG. 2I).

Figure 3E:
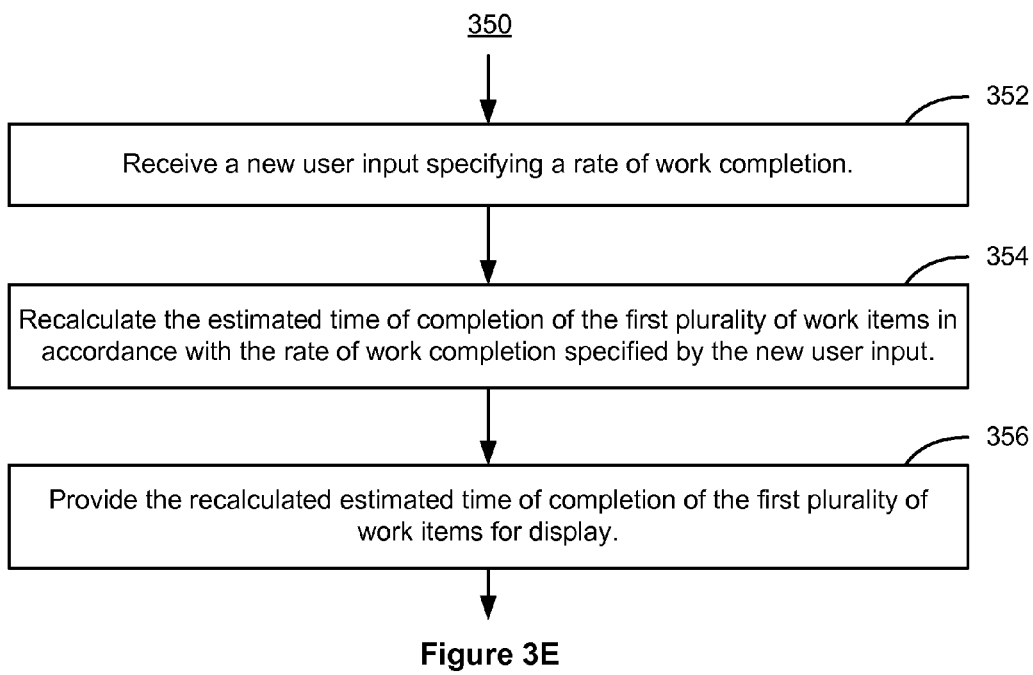

In some embodiments, the method 300 further includes the method 350 illustrated in FIG. 3E. In the method 350, a new user input specifying a rate of work completion is received (352) (e.g., via the input field 2106, FIG. 2J). The estimated time of completion of the first plurality of work items is recalculated (354) in accordance with the rate of work completion specified by the new user input. The recalculated estimated time of completion of the first plurality of work items is provided (356) for display (e.g., in the graph 2116 and/or as the forecasted date of completion 2128, FIG. 2I).

Figure 3F:
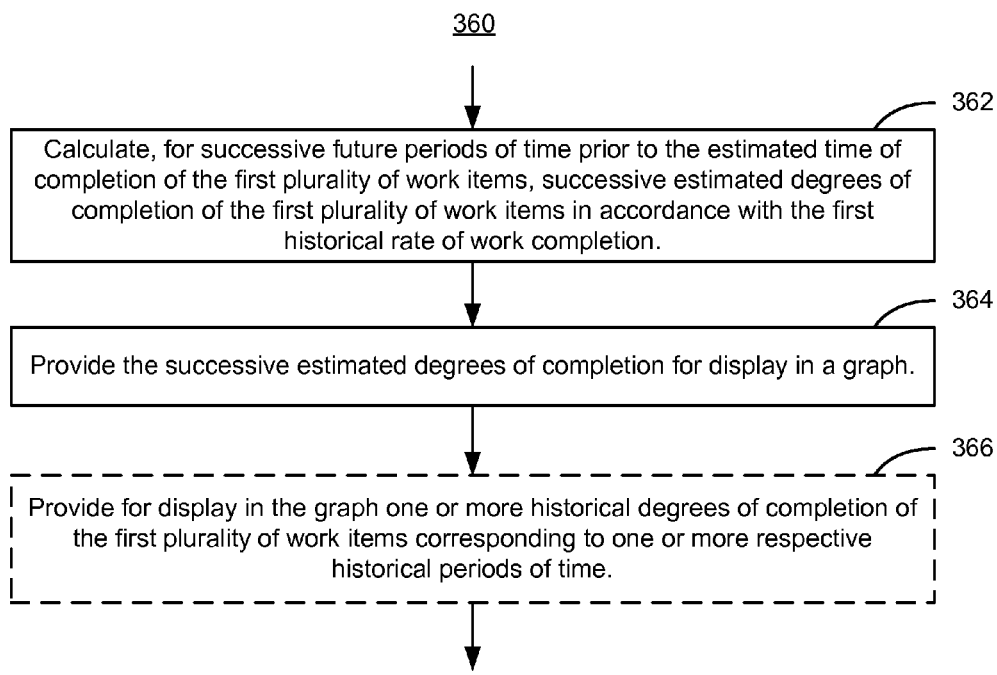

In some embodiments, the method 300 further includes the method 360 illustrated in FIG. 3F. In the method 360, successive estimated degrees of completion of the first plurality of work items are calculated (362) for successive future periods of time prior to the estimated time of completion of the first plurality of work items in accordance with the first historical rate of work completion. For example, the successive estimated degrees of completion are calculated by extrapolating from a current degree of completion assuming a constant future rate of work completion equal to the first historical rate of work completion. In some embodiments, the successive future periods of time correspond to successive future iterations in an agile software development process.

The successive estimated degrees of completion are provided for display (364) in a graph (e.g., for display by successive bars in the group 2120, FIG. 2I). In some embodiments, one or more historical degrees of completion of the first plurality of work items corresponding to one or more respective historical periods of time are also provided for display (366) in the graph (e.g., for display by successive bars in the group 2118, FIG. 2I).

In some embodiments, the graph is a bar graph (e.g., 2116, FIG. 2I) having respective bars (e.g., group 2120, FIG. 2I) corresponding to respective estimated degrees of completion for respective future periods of time of the successive future periods of time. In some embodiments, the graph is a line graph, scatter plot, or other type of graph.

The method 300 thus provides a user-friendly, flexible, and robust way to perform project schedule forecasting on the fly. While the method 300 includes a number of operations that appear to occur in a specific order, it should be apparent that the method 300 can include more or fewer operations, which can be executed serially or in parallel. An order of two or more operations may be changed and two or more operations may be combined into a single operation.

In some embodiments, performance of various operations in the method 300 may be split between client and server systems, as described below with regard to FIG. 4. In some embodiments, the method 300 is performed entirely at a server system (e.g., 404, FIG. 4), such that receiving the first and second user inputs in operations 302 and 304 includes receiving, at a server, data corresponding to the first and second user inputs as transmitted from a client (e.g., 402, FIG. 4) and transmitting times of completion in operations 310 and 312 includes transmitting data corresponding to the times of completion from the server to the client. In some embodiments, the method 300 is performed entirely at a computer-system running stand-alone project management software.

FIG. 4 is a block diagram illustrating an agile development management system 400 in accordance with some embodiments. The agile development management system 400 includes a server system 404 coupled to one or more client systems 402 by a network 406. The client systems 402 may include client systems associated with respective users such as software developers, testers, managers, clients, customers, vendors, and any other parties involved in agile software development. The network 406 may be any suitable wired and/or wireless network and may include a local area network (LAN), wide area network (WAN), virtual private network (VPN), the Internet, metropolitan area network (MAN), or any combination of such networks. While FIG. 4 is described as an agile development management system, similar systems may be implemented for other types of project management.

The server system 404 includes a server 408 and a database 410. Server 408 serves as a front-end for the server system 404. Server 408, sometimes called a front end server, provides an interface between the server system 404 and the client systems 402. In some embodiments, the functions of server 408 may be divided or allocated among two or more servers.

Figure 7:
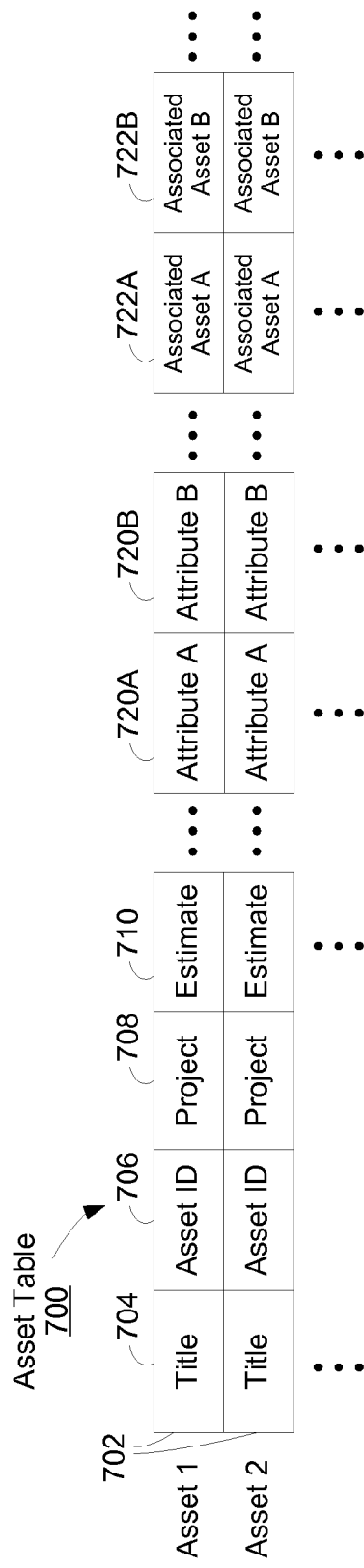
FIG. 7 is a diagram illustrating a data structure for assets in accordance with some embodiments.

The server system 404 stores data relating to the agile development process, including asset data 412. The asset data 412 includes attributes for respective assets. An exemplary data structure 700 for asset data 412 is illustrated in FIG. 7, described below. The asset data 412 includes goal data 414 and historical work completion data 416.

It should be appreciated that the server system 404, including the server 408 and the database 410, may be implemented as a distributed system of multiple computers. However, for convenience of explanation, the server system 404 is described herein as being implemented on a single computer, which can be considered a single logical system.

A user interfaces with the server system 404 at a client system or device 402 (hereinafter called the client system for ease of reference). The client system 402 includes a computer 424 or computer controlled device, such as a personal digital assistant (PDA), cellular telephone or the like. The computer 424 typically includes one or more processors (not shown); memory, which may include volatile memory (not shown) and non-volatile memory such as a hard disk drive 426; and a display 420. The computer 424 may also have input devices such as a keyboard and a mouse (not shown).

In some embodiments, a user may interact with the server system 404 via an agile development user interface 422 presented on the display 420. Examples of user interfaces 422 are illustrated in FIGS. 2A-2K. In some embodiments, the agile development user interface 422 may be a web-based user interface. That is, the user interface 422 may include one or more web pages. It is noted that a single web page can contain multiple frames, each of which may appear (when displayed by a browser application) to be a distinct web page. The web page(s) may be written in the Hypertext Markup Language (HTML), Extensible Markup Language (XML), or any other suitable language for preparing web pages, and may include one or more scripts for interfacing with the server system 404. For example, the web page(s) may include a JavaScript application that interfaces with the server system 404 via an application programming interface (API). The JavaScript application receives asset data and reporting data from the server system 404, manages the rendering of that data at the client, and also performs the client-side aspects of other tasks, such as receiving user input assigning assets to goals and updating attribute values according to data entered in user input fields, and transmitting user requests to the server system 404.

In some other embodiments, the agile development user interface 422 may be a part of a stand-alone application that is run on the client system 402. The standalone application may interface with the server system 404 via an application programming interface (API).

The agile development management system 400 may perform the method 300 (FIG. 3A), including the methods 320, 330, 340, 350, and/or 360 (FIGS. 3B-3F), in accordance with some embodiments. Performance of various operations in the method 300 may be divided between the client system 402 and server system 404. For example, operations 302 and 304 may be performed at a client system 402, and the received input may be transmitted to the server system 404, where operations 306-312 are performed, such that providing an estimated (and, in some embodiments, a previously scheduled) time of completion includes transmitting the time of completion from the server system 404 to the client system 402 for display. This allocation of operations between the client system 402 and server system 404 is merely one example of multiple possible allocations. In some embodiments, the method 300 is performed entirely by the server system 404.

Instead of using a client-sever model, project management software (e.g., agile development management software) may be installed and used on a single computer system combining the functionalities of the server system 404 and client system 402. For example, the method 300 (FIGS. 3A-3F) may be performed entirely on a single computer system.

Figure 5:
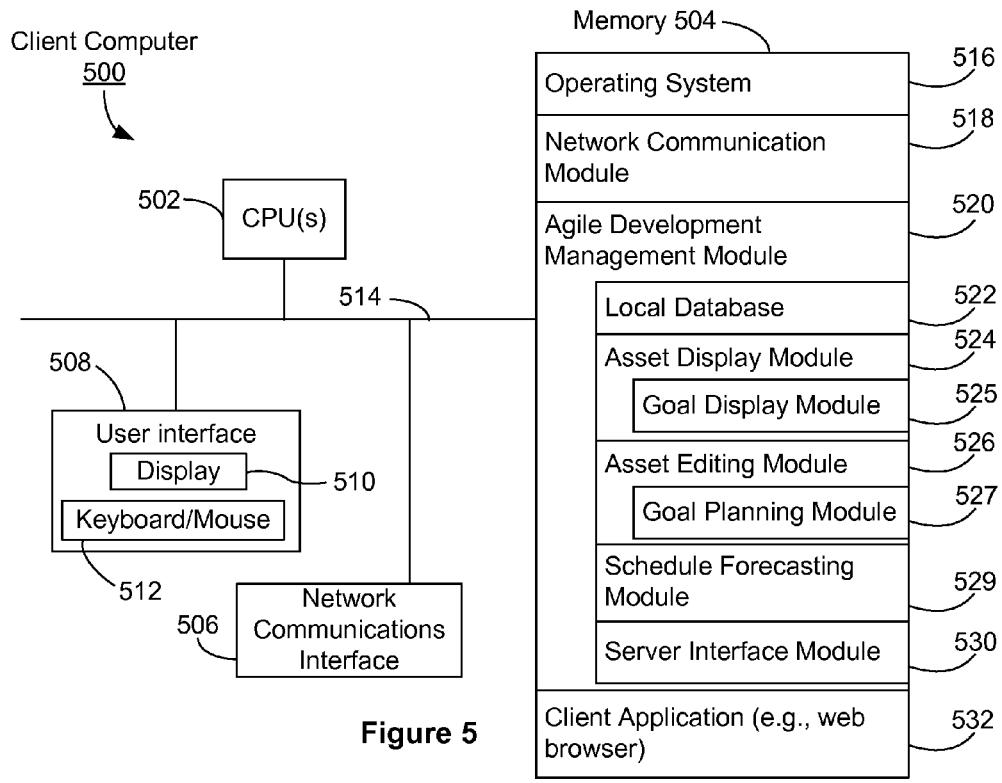
FIG. 5 is a block diagram illustrating a client computer in accordance with some embodiments.

FIG. 5 is a block diagram illustrating a client computer in accordance with some embodiments. The client computer 500, which may be used as a client system 402 (FIG. 4), typically includes one or more processing units (CPUs) 502, one or more network or other communications interfaces 506, memory 504, and one or more communication buses 514 for interconnecting these components. The communication buses 514 may include circuitry (sometimes called a chipset) that interconnects and controls communications between system components. The client computer 500 may also include user interface hardware 508 comprising a display device 510 and a keyboard and/or mouse (or other pointing device) 512. Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. Memory 504, or alternately non-volatile memory device(s) within memory 504, comprises a computer readable storage medium. In some embodiments, memory 504 stores the following programs, modules, and data structures, or a subset thereof:

- an operating system 516 that includes procedures for handling various basic system services and for performing hardware dependent tasks;
- a network communication module 518 that is used for connecting the client computer 500 to other computers via the one or more communication network interfaces 506 and one or more communication networks, such as the Internet, other wide area networks, local area networks, metropolitan area networks, and so on;
- an agile development management module 520 for handling data relating to the agile development process; and
- a client application 532, such as a web browser.

In some embodiments, the agile development management module 520 includes a local database 522 for storing data sent by the server (e.g., asset data, which includes goal data and historical work completion data), an asset display module 524 for displaying assets (e.g., via UI 200, FIG. 2A or UI 251, FIG. 2B) and for displaying an asset's attributes and related assets (e.g., via window 290, FIGS. 2C-2D), an asset editing module 526 for updating attribute values (e.g., in accordance with data entered via user input fields), a schedule forecasting module 529 for performing project schedule forecasting (e.g., via UI 2100, FIGS. 2I-2K), and a server interface module 530 for interfacing with server computer 500. The asset display module 524 includes a goal display module 525 for displaying goals (e.g., via UI 2002, FIG. 2E or UI 2070, FIGS. 2G-2H). The asset editing module 526 includes a goal planning module 527 for creating and editing goals (e.g., via UI 2040, FIG. 2F and UI 2070, FIGS. 2G-2H). In some embodiments, the schedule forecasting module 529 correspond to instructions for performing all or a portion of the operations in the method 300 (FIGS. 3A-3F). In some embodiments, the server interface module 530 includes a cache for storing data to be transmitted to the server.

In some embodiments, the agile development management module 520 may be a script-based module, embedded in a web page served from the server system 404 (FIG. 4). The web page may be rendered by a client application 532, such as a web browser, at the client computer 500. When the web page is rendered, the agile development management module 520 is executed, thereby providing a web-based interface to the server system 404. The script-based agile development management module may be written in JavaScript, AJAX, ECMAScript, Perl, or any other suitable scripting language.

In some other embodiments, the agile development management module 520 may be a standalone application stored in memory 504 of the client computer 500.

In some embodiments, the agile development management module 520 is replaced with a more general project management module that is not specific to agile software development.

Each of the above identified elements in FIG. 5 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 504 may store a subset of the modules and data structures identified above. Furthermore, memory 504 may store additional modules and data structures not described above.

Figure 6:
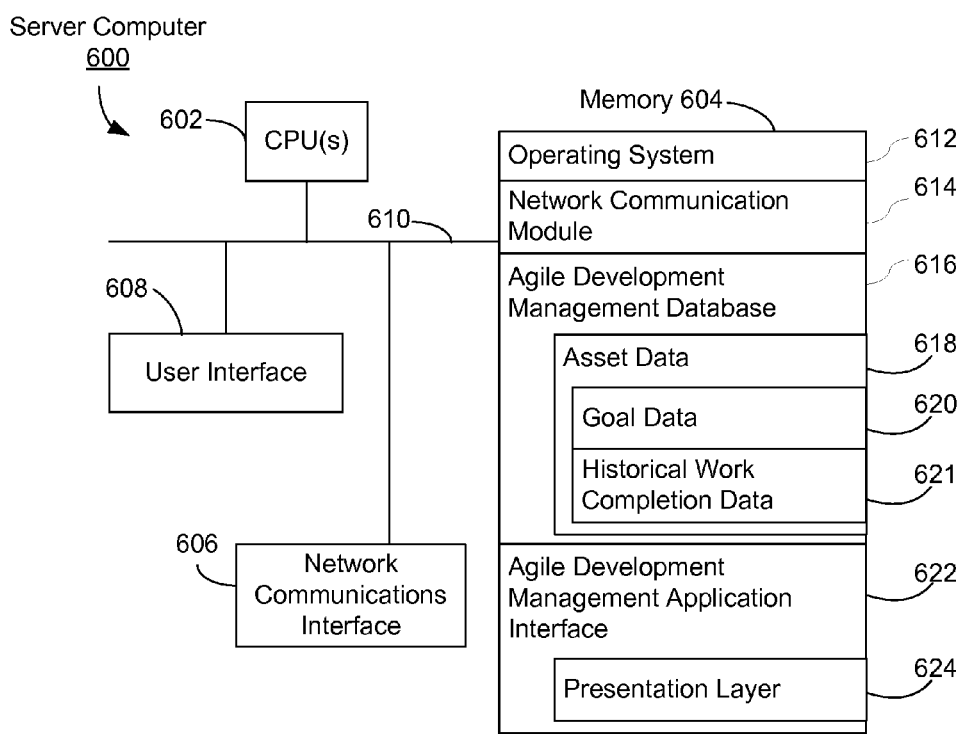
FIG. 6 is a block diagram illustrating a server computer in accordance with some embodiments.

FIG. 6 is a block diagram illustrating a server computer 600 in accordance with some embodiments. The server computer 600, which may be used as a server system 404 (FIG. 4), typically includes one or more processing units (CPUs) 602, one or more network or other communications interfaces 606, memory 604, and one or more communication buses 610 for interconnecting these components. The communication buses 610 may include circuitry (sometimes called a chipset) that interconnects and controls communications between system components. The server system 600 optionally may include user interface hardware 608, which may include a display device (not shown), and a keyboard and/or a mouse (not shown). Memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 604 may optionally include one or more storage devices remotely located from the CPU(s) 602. Memory 604, or alternately non-volatile memory device(s) within memory 604, comprises a computer readable storage medium. In some embodiments, memory 604 stores the following programs, modules and data structures, or a subset thereof:

- an operating system 612 that includes procedures for handling various basic system services and for performing hardware dependent tasks;
- a network communication module 614 that is used for connecting the server system 600 to other computers via the one or more communication network interfaces 606 and one or more communication networks, such as the Internet, other wide area networks, local area networks, metropolitan area networks, and so on;
- an agile development management database 616 for storing data relating to the agile development process, including asset data 618; and
- an agile development management application programming interface (API) 622 for exchanging information with the agile development management modules 520 in one or more client computers 500.

In some embodiments, the asset data 618 includes goal data 620 and historical work completion data 621. In some embodiments, the agile development management database 616 includes database management software for performing one or more operations of the method 300 (FIGS. 3A-3F). In some embodiments, the application interface 622 includes a presentation layer 624 for rendering user interfaces (e.g., FIGS. 2A-2K) accessed by a client system 402.

In some embodiments, the agile development management database 520 is replaced with a more general project management database that is not specific to agile software development.

Each of the above identified elements in FIG. 6 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 604 may store a subset of the modules and data structures identified above. Furthermore, memory 604 may store additional modules and data structures not described above.

Although FIG. 6 shows a "server computer," FIG. 6 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers.

The agile development management database 616 stores data in various tables. For example, an "Asset Type" table includes an entry for each kind of asset, such as goal, feature group, feature, defect, task, or test. An "Attribute Definition" table defines the attributes associated with each kind of asset listed in the "Asset Type" table. A "Synthetic Attribute" table references formulas used to calculate synthetic attributes. For example, if a work estimate or degree of completion is defined as a roll-up of estimates or degrees of completion for other assets, the roll-up may be specified in a Synthetic Attribute table. An "Attribute Security Check" table contains references to operations used to determine whether a user may access or modify particular attributes. For attributes that are associated assets, a "Relation Definition" table defines relationships between assets. In addition, a "Many to Many Relation Definition" table may contain relationship information for assets in many-to-many relationship with other assets. Other tables may specify business rules for various assets.

Attribute values for particular assets are stored in asset tables 700, as illustrated in FIG. 7 in accordance with some embodiments. In some embodiments, a table 700 corresponds to a particular type of asset, such as goal, feature group, feature, defect, task, or test. The asset table 700 includes a row 702 for each respective asset stored in the table. Each row includes fields that contain values for attributes of the respective asset, as defined in the "Attribute Definition" table. For example, the attribute fields may include title 704, asset ID 706, project 708, estimate 710, and various other attributes 720 (e.g., progress/degree of completion). The asset table 700 also includes fields 722 to specify attributes that are associated (i.e., related) assets. For example, if a respective asset is a feature or defect, fields 722 may specify tasks and tests associated with the feature or defect, for example by providing the asset IDs of the tasks and tests. If a respective asset is a goal, fields 722 may specify work items assigned to the goal. In another example, a field 722 may specify an iteration to which an asset is assigned.

In some embodiments, an asset table 700 for work items stores multiple versions of respective work items, wherein each version of a respective work item has a distinct work estimate value. The version is specified, for example, in a version field.

The tables 700 thus include information to allow the agile development management application interface 622 to respond to a request from a client computer 500 when a user seeks to create, display, and modify assets or to access information regarding assets. The interface 622 can access the asset tables 700 (e.g., by writing to or querying the tables 700) in response to requests from the client computer 500.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of performing project schedule forecasting based on stored project data, the method comprising:
   receiving a first user input selecting a first plurality of work items in a project, respective work items of the first plurality of work items having respective work estimates;
   receiving a second user input specifying one or more first work item attributes including a first team or a first historical period of time, the one or more first work item attributes referencing historical work completion data associated with the first team or the first historical period of time, wherein
      the first historical period of time specifies a complete iteration or a complete product release in an agile software development process during which the project and the plurality of work items are being developed;
   determining, using a statistical metric, a first historical rate of work completion in accordance with the historical work completion data associated with the first team or the first historical period of time, wherein
      the statistical metric includes at least one of:
         a first group including an average velocity, a highest velocity, and a lowest velocity previously achieved by the first team, and
         a second group including an average velocity, a highest velocity, and a lowest velocity previously achieved in the first historical period of time;
   calculating an estimated time of completion of the first plurality of work items in accordance with the first historical rate of work completion; and
   providing the estimated time of completion of the first plurality of work items for display.

2. The computer-implemented method of claim 1, further comprising:
   providing a previously scheduled time of completion of the first plurality of work items for display, for comparison to the estimated time of completion.

3. The computer-implemented method of claim 1, wherein the respective work estimates comprise estimates of remaining work for respective work items of the first plurality of work items.

4. The computer-implemented method of claim 1, wherein:
   the first plurality of work items corresponds to a first goal in the project; and
   the estimated time of completion of the first plurality of work items provides an estimated time of completion of the first goal.

5. The computer-implemented method of claim 1, wherein:
   the first plurality of work items corresponds to a product release; and
   the estimated time of completion of the first plurality of work items provides an estimated date for the product release.

6. The computer-implemented method of claim 1, further comprising:
   receiving a third user input specifying a second team, the second team being distinct from the first team;
   determining a second historical rate of work completion in accordance with historical work completion data for the second team;
   recalculating the estimated time of completion of the first plurality of work items in accordance with the second historical rate of work completion; and
   providing the recalculated estimated time of completion of the first plurality of work items for display.

7. The computer-implemented method of claim 1, further comprising:
   receiving a third user input specifying a second historical period of time distinct from the first historical period of time;
   determining a second historical rate of work completion in accordance with historical work completion data during the second historical period of time;
   recalculating the estimated time of completion of the first plurality of work items in accordance with the second historical rate of work completion; and
   providing the recalculated estimated time of completion of the first plurality of work items for display.

8. The computer-implemented method of claim 1, wherein:
   the second user input specifies a first statistical metric; and
   the first historical rate of work completion is calculated based on historical work completion data in accordance with the first statistical metric.

9. The computer-implemented method of claim 8, wherein the first statistical metric is selected from the group consisting of an average rate of work completion, an above-average rate of work completion, and a below-average rate of work completion.

10. The computer-implemented method of claim 8, further comprising:
    receiving a third user input specifying a second statistical metric distinct from the first statistical metric;
    determining a second historical rate of work completion based on historical work completion data in accordance with the second statistical metric;
    recalculating the estimated time of completion of the first plurality of work items in accordance with the second historical rate of work completion; and providing the recalculated estimated time of completion of the first plurality of work items for display.

11. The computer-implemented method of claim 1, wherein the first user input specifies a status of respective work items of the first plurality of work items.

12. The computer-implemented method of claim 1, wherein the first user input specifies a team to which respective work items of the first plurality of work items are assigned.

13. The computer-implemented method of claim 1, wherein the first user input specifies a priority of respective work items of the first plurality of work items.

14. The computer-implemented method of claim 1, wherein the first user input specifies a feature group with which respective work items of the first plurality of work items are associated, the feature group being associated with an agile software development process.

15. The computer-implemented method of claim 1, further comprising:
 receiving a third user input specifying one or more second work item attributes referencing historical work completion data, the one or more second work item attributes being distinct from the one or more first work item attributes;
 determining a second historical rate of work completion in accordance with the historical work completion data referenced by the one or more second work item attributes;
 recalculating the estimated time of completion of the first plurality of work items in accordance with the second historical rate of work completion; and
 providing the recalculated estimated time of completion of the first plurality of work items for display.

16. The computer-implemented method of claim 1, further comprising:
 receiving a third user input selecting a second plurality of work items in the project, respective work items of the second plurality of work items having respective work estimates, the second plurality of work items being distinct from the first plurality of work items;
 calculating an estimated time of completion of the second plurality of work items in accordance with the first historical rate of work completion; and
 providing the estimated time of completion of the second plurality of work items for display.

17. The computer-implemented method of claim 1, further comprising:
 receiving a third user input specifying a work estimate;
 calculating an estimated time of completion of the work estimate specified by the third user input in accordance with the first historical rate of work completion; and
 providing the estimated time of completion of the work estimate specified by the third user input for display.

18. The computer-implemented method of claim 1, further comprising:
 receiving a third user input specifying a rate of work completion;
 recalculating the estimated time of completion of the first plurality of work items in accordance with the rate of work completion specified by the third user input; and
 providing the recalculated estimated time of completion of the first plurality of work items for display.

19. The computer-implemented method of claim 1, the method further comprising:
 calculating, for successive future periods of time prior to the estimated time of completion of the first plurality of work items, successive estimated degrees of completion of the first plurality of work items in accordance with the first historical rate of work completion; and
 providing the successive estimated degrees of completion for display in a graph.

20. The computer-implemented method of claim 19, wherein the successive future periods of time correspond to successive future iterations in an agile software development process.

21. The computer-implemented method of claim 19, wherein the successive estimated degrees of completion are provided for display in a bar graph, the bar graph having respective bars corresponding to respective estimated degrees of completion for respective future periods of time of the successive future periods of time.

22. The computer-implemented method of claim 19, further comprising:
 providing for display in the graph one or more historical degrees of completion of the first plurality of work items corresponding to one or more respective historical periods of time.

23. A system for performing project schedule forecasting based on stored project data, the system comprising:
 memory;
 a display;
 one or more processors; and
 one or more programs stored in the memory and configured for execution by the one or more processors, the one or more programs including:
 instructions to receive a first user input selecting a first plurality of work items in a project, respective work items of the first plurality of work items having respective work estimates;
 instructions to receive a second user input specifying one or more first work item attributes including a first team or a first historical period of time, the one or more first work item attributes referencing historical work completion data associated with the first team or the first historical period of time, wherein
 the first historical period of time specifies a complete iteration or a complete product release in an agile software development process during which the project and the plurality of work items are being developed;
 instructions to determine, using a statistical metric, a first historical rate of work completion in accordance with the historical work completion data associated with the first team or the first historical period of time, wherein the
 statistical metric includes at least one of:
 a first group including an average velocity, a highest velocity, and a lowest velocity associated with the first team, and
 a second group including an average velocity, a highest velocity, and a lowest velocity associated with the first historical period of time;
 instructions to calculate an estimated time of completion of the first plurality of work items in accordance with the first historical rate of work completion; and
 instructions to provide the estimated time of completion of the first plurality of work items for display.

24. A non-transitory computer readable storage medium storing one or more programs configured to be executed by a computer system to perform project schedule forecasting based on stored project data, the one or more programs comprising:

instructions to receive a first user input selecting a first plurality of work items in a project, respective work items of the first plurality of work items having respective work estimates;
instructions to receive a second user input specifying one or more first work item attributes including a first team or a first historical period of time, the one or more first work item attributes referencing historical work completion data associated with the first team or the first historical period of time, wherein
the first historical period of time specifies a complete iteration or a complete product release in an agile software development process during which the project and the plurality of work items are being developed;
instructions to determine, using a statistical metric, a first historical rate of work completion in accordance with the historical work completion data associated with the first team or the first historical period of time, wherein the
statistical metric includes at least one of:
a first group including an average velocity, a highest velocity, and a lowest velocity associated with the first team, and
a second group including an average velocity, a highest velocity, and a lowest velocity associated with the first historical period of time;
instructions to calculate an estimated time of completion of the first plurality of work items in accordance with the first historical rate of work completion; and
instructions to provide the estimated time of completion of the first plurality of work items for display.

* * * * *